United States Patent [19]

Matsumoto et al.

[11] Patent Number: 5,896,187
[45] Date of Patent: Apr. 20, 1999

[54] PHOTOSENSITIVE MATERIAL PROCESSING METHOD AND PHOTOSENSITIVE MATERIAL PROCESSING APPARATUS

[75] Inventors: Nobuo Matsumoto; Kenji Suzuki, both of Kanagawa, Japan

[73] Assignee: Fuji Photo Film Co., Ltd., Kanagawa, Japan

[21] Appl. No.: 08/924,845

[22] Filed: Sep. 5, 1997

[30] Foreign Application Priority Data

Sep. 6, 1996 [JP] Japan ................... 8-236831

[51] Int. Cl.⁶ ................ G03B 27/44; G03B 27/52
[52] U.S. Cl. ................ 355/29; 355/46; 355/54
[58] Field of Search ................ 355/28, 29, 46, 355/54, 72, 89, 127

[56] References Cited

U.S. PATENT DOCUMENTS 5,438,388  8/1995  Arimoto et al. ............... 355/28
5,452,050  9/1995  Ishikawa et al. ............... 355/27
5,678,111  10/1997  Matsumoto ............... 396/564

Primary Examiner—Alan A. Mathews
Attorney, Agent, or Firm—Sughrue, Mion, Zinn, Macpeak & Seas, PLLC

[57] ABSTRACT

A photosensitive material processing method in which a sheet-formed photosensitive material, which has been cut to predetermined sizes, is conveyed to an exposure stage and processed, wherein: the exposure stage has a function of exposing simultaneously a plurality of sheet-formed photosensitive materials, and at the upstream of the exposure stage, the photosensitive materials are sorted and conveyed so as to be able to be exposed simultaneously. Therefore, in a case in which there is a plurality of exposure stages, the photosensitive materials are not prepared in advance on the conveying paths along the exposure stages, and the sheet-formed photosensitive materials, which are selectively conveyed from one direction, are sorted, if necessary.

15 Claims, 19 Drawing Sheets

☐ : NO PHOTOGRAPHIC PRINTING PAPER
☒ : PHOTOGRAPHIC PRINTING PAPER IS HELD

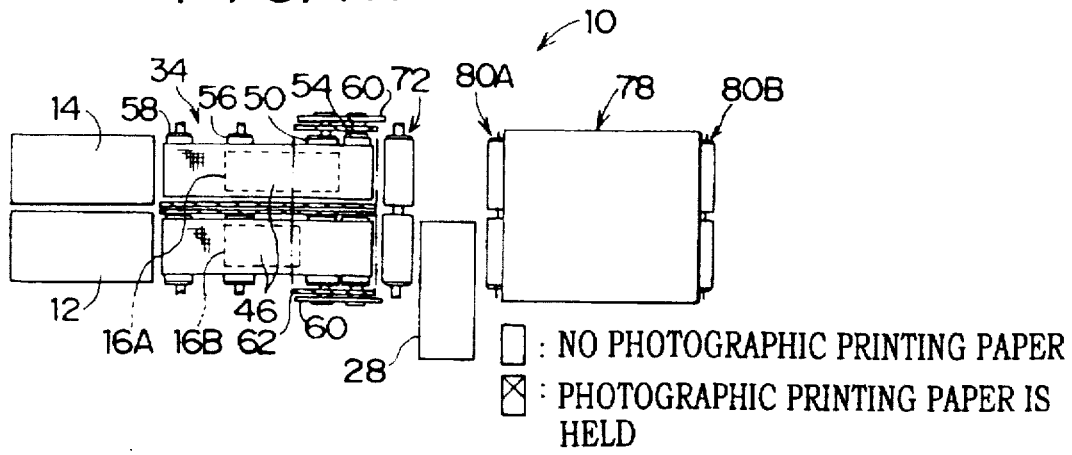
□ : NO PHOTOGRAPHIC PRINTING PAPER
☒ : PHOTOGRAPHIC PRINTING PAPER IS HELD
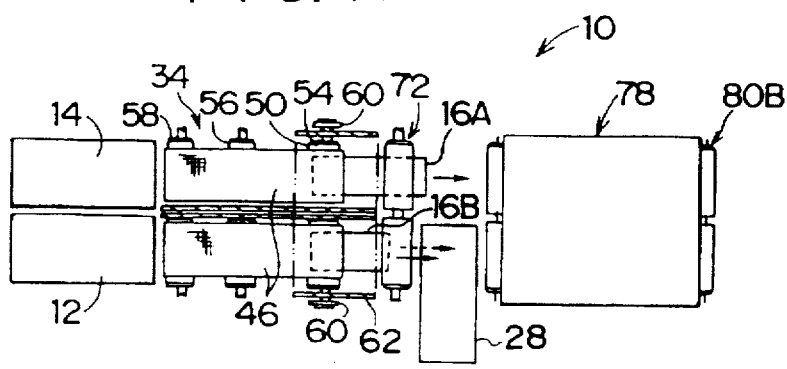
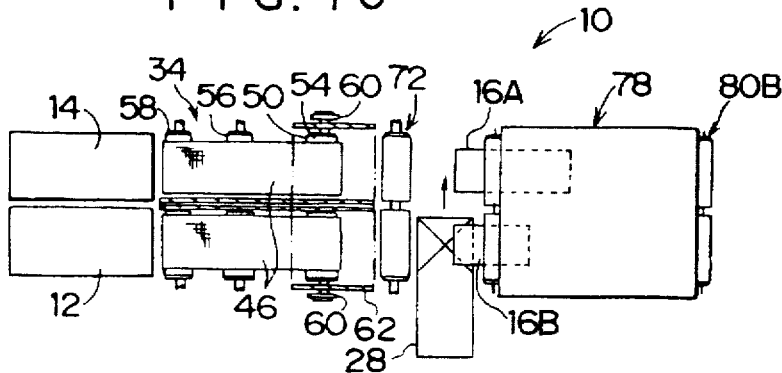
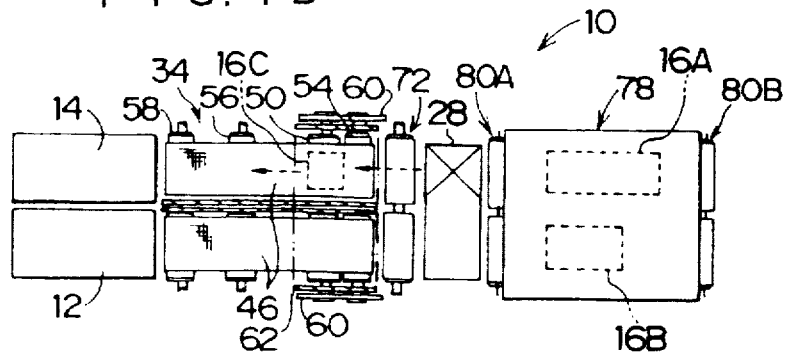

☐ : NO PHOTOGRAPHIC PRINTING PAPER
☒ : PHOTOGRAPHIC PRINTING PAPER IS HELD

F I G. 9A
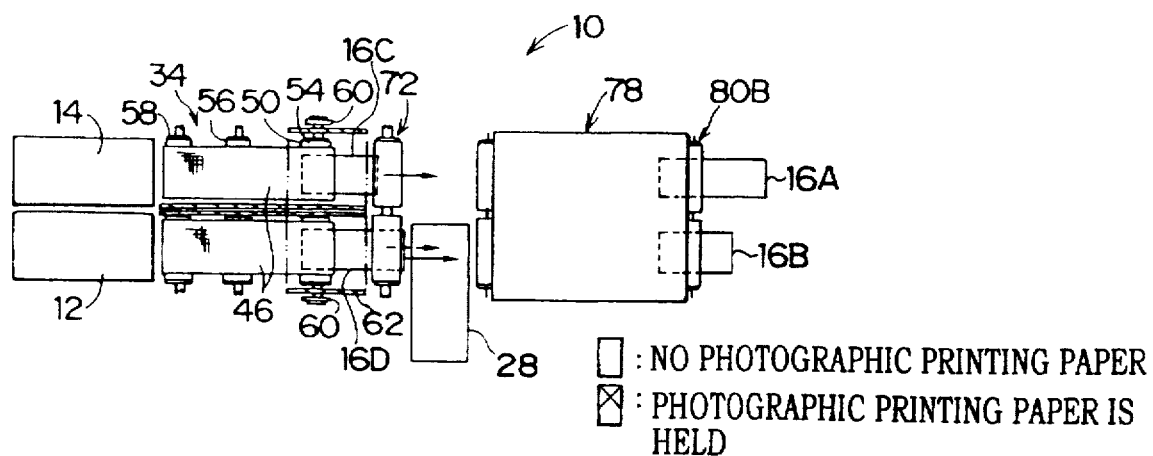
☐ : NO PHOTOGRAPHIC PRINTING PAPER
☒ : PHOTOGRAPHIC PRINTING PAPER IS HELD
F I G. 9B
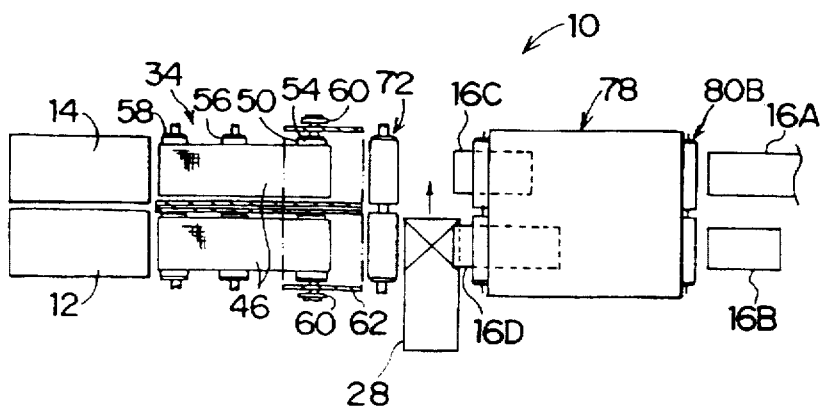

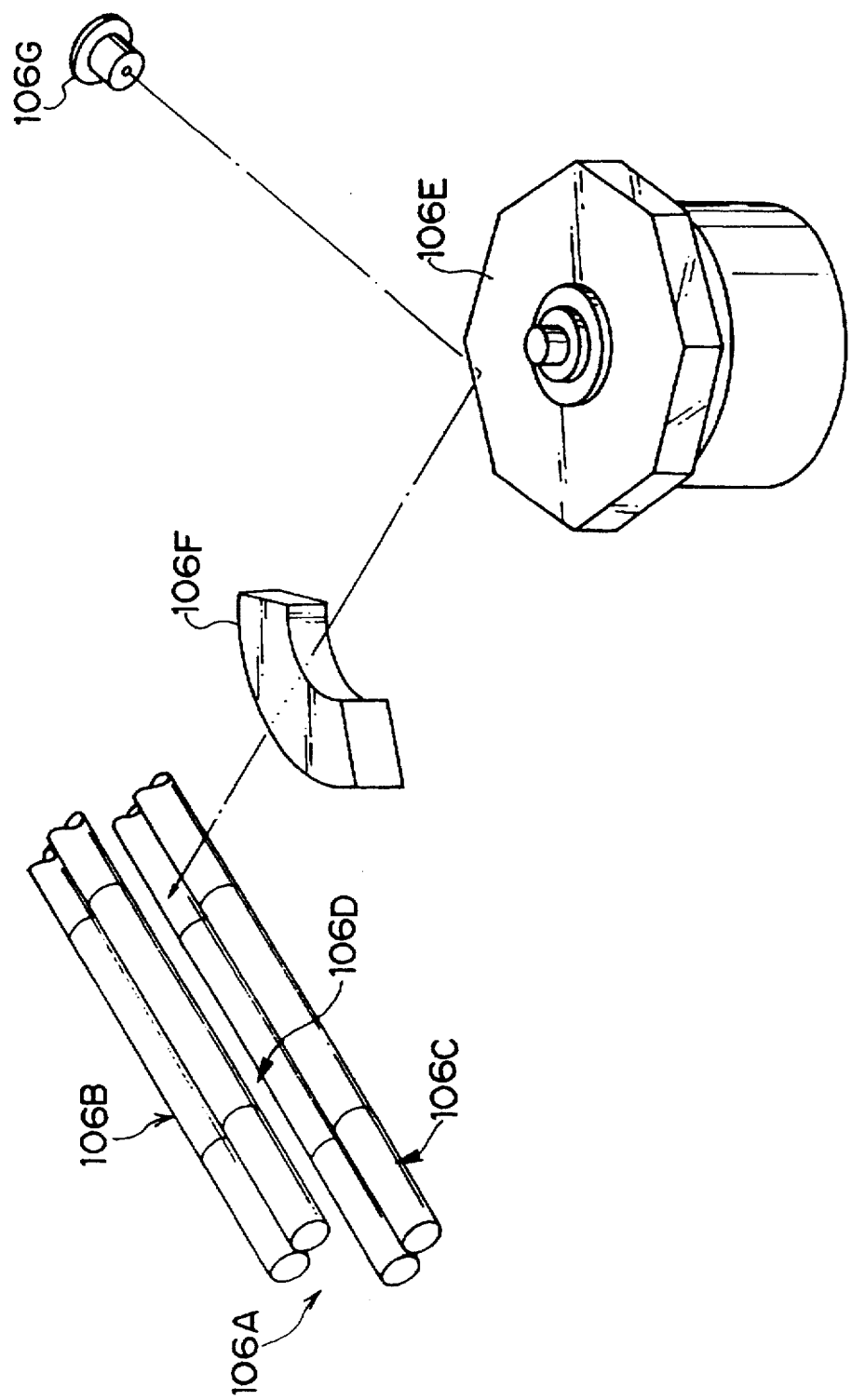
F I G. 1 4

PHOTOSENSITIVE MATERIAL PROCESSING METHOD AND PHOTOSENSITIVE MATERIAL PROCESSING APPARATUS

BACKGROUND OF THE INVENTION

1. Field of the Invention

The present invention relates to a photosensitive material processing method in which a sheet-formed photosensitive material, which has been cut to predetermined sizes, is successively conveyed to an exposure stage and processed, and to a photosensitive material processing apparatus in which a plurality of sheet-formed photosensitive materials, which have been cut to predetermined sizes, is disposed in a row and conveyed to an exposure stage and processed.

2. Description of the Related Art

In a case in which a photosensitive material is processed, quick processing thereof is demanded. In order to achieve this, both increasing of the conveying speed of a photosensitive material and decreasing of the exposure time thereof are demanded. With regard to the increasing of the conveying speed of the photosensitive material, it suffices if the conveying path of the photosensitive material is provided. Further, with regard to the decreasing of the exposure time of the photosensitive material, it suffices if an exposure stage is provided at every additional conveying path.

In order to achieve this, an applicant proposes a photosensitive material processing apparatus in which a magazine is provided at every plurality of rows of conveying paths, such that a plurality of rows of photosensitive materials provided from the magazines can be simultaneously processed, and a wide photosensitive material can be processed over the plurality of rows of conveying paths (as an example, see Japanese Patent Application Laid-Open No. 8-314022).

In the proposed photosensitive material processing apparatus, normally, the plurality of rows of photosensitive materials can be processed and the wide photosensitive material can be processed on the same stage.

However, when the plurality of rows of photosensitive materials is processed simultaneously, the photosensitive materials accommodated within the plurality of magazines become simultaneously empty. Accordingly, the process must be interrupted for the replacement of the magazines. The degrees of exhaustion of the photosensitive materials within the plurality of magazines are not invariably be the same due to the difference in size of the photosensitive materials. However, it is not clear when the photosensitive material becomes empty. Thus, an operator must invariably wait and monitor the process.

Further, as related art, the following prior arts are disclosed.

① Japanese Utility Model Application Publication No. 58-29464

A technology in which a photosensitive material, which has been exposed and cut, is divided into a plurality of rows. Until the photosensitive material is exposed and accommodated, as in a conventional method, one-row processing of the photosensitive material is still effected.

② Japanese Utility Model Application Laid-Open No. 57-78052

A technology in which in a printing apparatus of a single exposure system, a plurality of magazines is provided at the apparatus main body and the magazines can be replaced as occasion demands. It is necessary that photosensitive materials be sorted quickly.

③ Japanese Utility Model Application Laid-Open No. 60-107841

A technology in which a photosensitive material is selectively withdrawn from a plurality of magazines so as to be cut and supplied to an exposure section. Since the photosensitive materials are not conveyed in parallel, it is not an efficient technology.

④ Japanese Patent Application Laid-Open No. 6-347905 and Japanese Patent Application Laid-Open No. 6-347907

A technology in which an exposure stage exists in each of the plurality of rows of conveying paths and exposed photosensitive materials are processed individually. In all of the processing systems, the number of exposure stages in accordance with the number of conveying paths is needed. Consequently, the size of an apparatus is increased.

⑤ Japanese Patent Application Laid-Open No. 6-347914

A technology in which a magazine is moved so as to correspond to a plurality of conveying paths and then photographic printing papers are sorted. Regarding the mass of the magazine, the size of a power source for rapid movement must be increased.

In this way, the above-described prior arts have both advantages and disadvantages. For example, there are drawbacks in that one-row processing is still effected, rapid sorting is needed, a plurality of exposure systems is required, and in a case in which a magazine is moved, the size of a power source for rapid movement is increased. Also, a lot of time is wasted.

SUMMARY OF THE INVENTION

With the aforementioned in view, an object of the present invention is to provide a photosensitive material processing method and a photosensitive material processing apparatus in which the maximum wasted time during the processing of a photosensitive material is removed, the efficiency of processing thereof is improved, and the rapid processing thereof can be achieved.

A first aspect of the present invention is a photosensitive material processing method in which a sheet-formed photosensitive material, which has been cut to predetermined sizes, is conveyed to an exposure stage and processed, wherein: the exposure stage has a function of exposing simultaneously a plurality of sheet-formed photosensitive materials, and at the upstream of the exposure stage, the photosensitive materials are sorted and conveyed so as to be able to be exposed simultaneously.

A second aspect of the present invention is a photosensitive material processing method, wherein: said sorting is effected on the conveying paths at the upstream of the exposure stage, and the photosensitive materials are moved in the direction normal to the conveying directions of the photosensitive materials.

In accordance with the first and second aspects, in a case in which there is a plurality of rows of exposure stages, the photosensitive materials are not prepared in advance on the conveying paths along the exposure stages, and the sheet-formed photosensitive materials, which are selectively conveyed from one direction, are sorted, if necessary.

In this way, even if the number of supplying paths of the photosensitive materials is smaller than the number of conveying paths thereof, apparently, the exposure and development processes can be effected simultaneously with the number of the exposure and development processes being equal to that of conveying paths. Further, the processes can be effected extremely efficiently and rapidly.

Moreover, a wide photosensitive material which extends over the plurality of conveying paths may be supplied.

A third aspect of the present invention is a photosensitive material processing method according to the first or second aspect, wherein the time in which the photosensitive materials are sorted to the conveying paths is one of shorter than and equal to the time in which the photosensitive materials are exposed at the exposure stage.

In accordance with the third aspect, because it is possible that the photosensitive materials be supplied selectively from the plurality of magazines to any conveying path, it is easy to change the widths and types of the photosensitive materials to be processed. Further, if the magazines which accommodate the same photosensitive materials are prepared, the processes are not interrupted, and the empty magazine can be replaced with the new one. Overall, the processing efficiency can be improved.

It is not necessary that the number of photosensitive materials in a row be the same as the number of magazines to be loaded.

A fourth aspect of the present invention is a photosensitive material processing method according to the third aspect, wherein the photosensitive materials are supplied from the magazines to the conveying paths, and simultaneously, the photosensitive materials are conveyed to the exposure stage.

In accordance with the fourth aspect, when the exposure processing at the exposure stage is completed, the next photosensitive material is conveyed to the exposure stage. At this time, the sorting of the photosensitive materials on the conveying paths is started. Accordingly, the photosensitive materials do not interfere with each other and can be supplied most rapidly.

A fifth aspect of the present invention is a photosensitive material processing method according to any one of the first through fourth aspects, wherein the time in which the photosensitive materials are sorted to the conveying paths is one of shorter than and equal to the time in which the photosensitive materials are exposed at the exposure stage.

In accordance with the fifth aspect, the time in which the supplied photosensitive materials are sorted onto the respective conveying paths is shorter than or equal to the time in which the photosensitive materials are exposed at the exposure stage. In this way, the standby time can be reduced. In order to match the time for sorting operation and the time for exposure processing, since it is comparatively easy to adjust the sorting operation, the time for sorting operation may be adjusted to the time for exposure processing.

A sixth aspect of the present invention is a photosensitive material processing method according to any one of the first through fifth aspects, wherein when the photosensitive materials are conveyed, the rear ends of the photosensitive materials are made uniform.

In accordance with the sixth aspect, in general, the order of the photosensitive materials for every conveying paths is determined at the sorting stage. In this case, however, when the rear ends of the photosensitive materials are not made uniform, the time in which the photosensitive material is finally discharged from the previous process (e.g., a drying process of development processing) is different in accordance with the size (the length in the conveying direction) of the photosensitive material. As a result, the discharge of the photosensitive material must be invariably monitored.

In contrast to this, as mentioned in the sixth aspect, as the rear ends of the photosensitive materials are made uniform and conveyed, the time in which the photosensitive material is discharged from the above-described previous process is the same for each of the conveying paths. Thus, it is easier to sort the photosensitive materials.

For example, there is a roller pair at the position in which the photosensitive material is discharged from the previous process. In a case in which the photosensitive material nipped and discharged by the roller pair is delivered to a belt conveyor which includes a conveying path in the direction normal to the conveying direction of the previous process, because the photosensitive materials are invariably-loaded on the belt conveyor in the order of conveying paths in the previous process, it is easier to sort the photosensitive materials.

A seventh aspect of the present invention is a photosensitive material processing apparatus in which a plurality of sheet-formed photosensitive materials, which has been withdrawn from a magazine accommodating an elongated photosensitive material and has been cut to predetermined sizes, is disposed in a row, conveyed to an exposure stage, and processed, comprising: a magazine in which the photosensitive materials are taken up and accommodated in a layer form; photosensitive material preparing means in which the photosensitive materials are withdrawn from the magazines and are cut to predetermined sizes so as to prepare sheet-formed photosensitive materials and in which the sheet-formed photosensitive materials are conveyed to initial positions of conveying paths; sorting means in which the photosensitive materials disposed at the initial positions of the conveying paths are sorted in the direction normal to the conveying directions of the photosensitive materials; conveying means in which the plurality of photosensitive materials are simultaneously conveyed to the exposure stage; and timing control means in which the conveyance timing of the photosensitive materials is controlled such that, during the exposure processing time at the exposure stage, sorting of the photosensitive materials by said sorting means is completed, and synchronized with the conveyance of the photosensitive materials to the exposure stage by said conveying means, said photosensitive material preparing means is operated so that the next photosensitive material is conveyed to the initial position.

In accordance with the seventh aspect, the photosensitive materials discharged from the magazines are cut to predetermined sizes and conveyed to the initial positions of the conveying paths (the photosensitive material preparing means). The photosensitive materials disposed at the initial positions of the conveying paths are sorted to the respective conveying paths by the sorting means. When the photosensitive materials are sorted to all of the conveying paths, the photosensitive materials are simultaneously conveyed to the exposure stage (the conveying means).

The photosensitive materials are exposed at the exposure stage. During this time, the sorting of the next photosensitive materials to the respective conveying paths are completed by the timing control means. After the exposure processing of the photosensitive materials at the exposure stage is completed, the photosensitive materials on the exposure stage are conveyed to the next process. At the same time, the next sorted photosensitive materials are conveyed to the exposure stage. Further, at the same time that the photosensitive materials are conveyed to the exposure stage, the withdrawal of the photosensitive materials from the magazine, the cutting thereof, and the conveying thereof to the initial positions of the conveying paths are started by the timing control means.

Since the plurality of magazines are loaded, when the photosensitive material within the magazine is removed or when the different photosensitive material is used, as the photosensitive material is withdrawn from the magazine loaded on the other conveying path, the processing is not interrupted and can be effected smoothly. Moreover, while the one magazine is used, the other magazine can be replaced with a new one. Thus, the time which is lost due to the replacement of the magazine will be gone.

An eighth aspect of the present invention is a photosensitive material processing apparatus in which a plurality of sheet-formed photosensitive materials, which has been cut to predetermined sizes, is disposed in a row, conveyed to an exposure stage, and processed, comprising: a magazine in which elongated photosensitive materials are accommodated; photosensitive material preparing means in which the photosensitive materials are withdrawn from said magazine and are cut to predetermined sizes so as to prepare sheet-formed photosensitive materials and in which the sheet-formed photosensitive materials are conveyed to initial positions of conveying paths; sorting means in which the rear ends of the photosensitive materials disposed at the initial positions of the conveying paths are made uniform and the photosensitive materials are sorted in the direction normal to the conveying directions of the photosensitive materials; conveying means in which, when the sorted photosensitive materials are disposed at corresponding start positions of the conveying paths, the plurality of photosensitive materials on the conveying paths are simultaneously conveyed to the exposure stage; and timing control means in which the conveyance timing of the photosensitive material is controlled such that, during the exposure processing time at the exposure stage, sorting of the photosensitive materials by said sorting means is completed, and synchronized with the conveyance of the photosensitive materials to the exposure stage by said conveying means, said photosensitive material preparing means is operated so that the next photosensitive material is conveyed to the initial position.

In accordance with the eight aspect, in addition to the aforementioned seventh aspect, when the photosensitive materials are sorted to the respective conveying paths at the sorting means, as the rear ends of the photosensitive materials are made uniform as described in the aforementioned sixth aspect, it is easier to sort the photosensitive materials.

A ninth aspect is a photosensitive material processing apparatus according to the eighth aspect, wherein said sorting means comprises: holding means in which the photosensitive materials withdrawn from said magazine are nipped and held at the positions which do not interfere with the conveying paths; moving means in which said holding means is moved in the direction normal to the conveying paths so as to correspond to each of the plurality of arranged conveying paths; a rear end detection sensor which is provided in the vicinity of the further upstream side of said holding means and in which the rear ends of the cut photosensitive materials are detected; a temporary accommodating portion which is provided at each of the conveying paths and is disposed so as to correspond to a stop position of said moving means; inversely conveying means in which, when the rear ends of the photosensitive materials are detected by said rear end detection sensor and said moving means is disposed at the position corresponding to a predetermined conveying path, the photosensitive materials are conveyed certain lengths in the directions of said temporary accommodating portions with the rear ends of the photosensitive materials being the first; and conveying means in which, when the predetermined photosensitive materials are accommodated within said temporary accommodating portions at the conveying paths by said inversely conveying means, the photosensitive materials are conveyed to the exposure stage.

In accordance with the ninth aspect, at first, the photosensitive materials conveyed from the photosensitive material preparing means are held and conveyed by the holding means. When the rear ends of the photosensitive materials are detected by the rear end detection sensor, the conveyance thereof is stopped. In this way, the rear ends of the photosensitive materials are invariably stopped at the same position.

After the photosensitive materials are stopped, the holding means is moved to the position which runs along each of the conveying paths by the moving means so that the holding means is corresponded to the predetermined conveying path.

Next, the holding means is driven and reversely conveyed by the reversely conveying means and the photosensitive materials are conveyed to the temporary accommodating portions. The time in which the holding means is reversely conveyed is constant and is longer than the time in which the longest photosensitive material is conveyed to the temporary accommodating portion. When the photosensitive materials are accommodated within all of the temporary accommodating portions, the photosensitive materials are conveyed by the conveying means from the temporary accommodating portions to the exposure stage all at once.

Due to the above-described structure, in a state in which the rear ends of the photosensitive materials are made uniform, the photosensitive materials are sorted to the plurality of conveying paths and supplied to the exposure stage.

BRIEF DESCRIPTION OF THE DRAWINGS

FIG. 7A is a schematic view which shows the procedure of conveying the photographic printing paper following FIG. 6D.

FIG. 7B is a schematic view which shows the procedure of conveying the photographic printing paper.

FIG. 7C is a schematic view which shows the procedure of conveying the photographic printing paper.

FIG. 7D is a schematic view which shows the procedure of conveying the photographic printing paper.

FIG. 9A is a schematic view which shows the procedure of conveying the photographic printing paper following FIG. 8D.

FIG. 9B is a schematic view which shows the procedure of conveying the photographic printing paper.

FIG. 14 is a schematic view of an exposure stage for digital exposure.

DESCRIPTION OF THE PREFERRED EMBODIMENTS

First Embodiment

Figure 1:
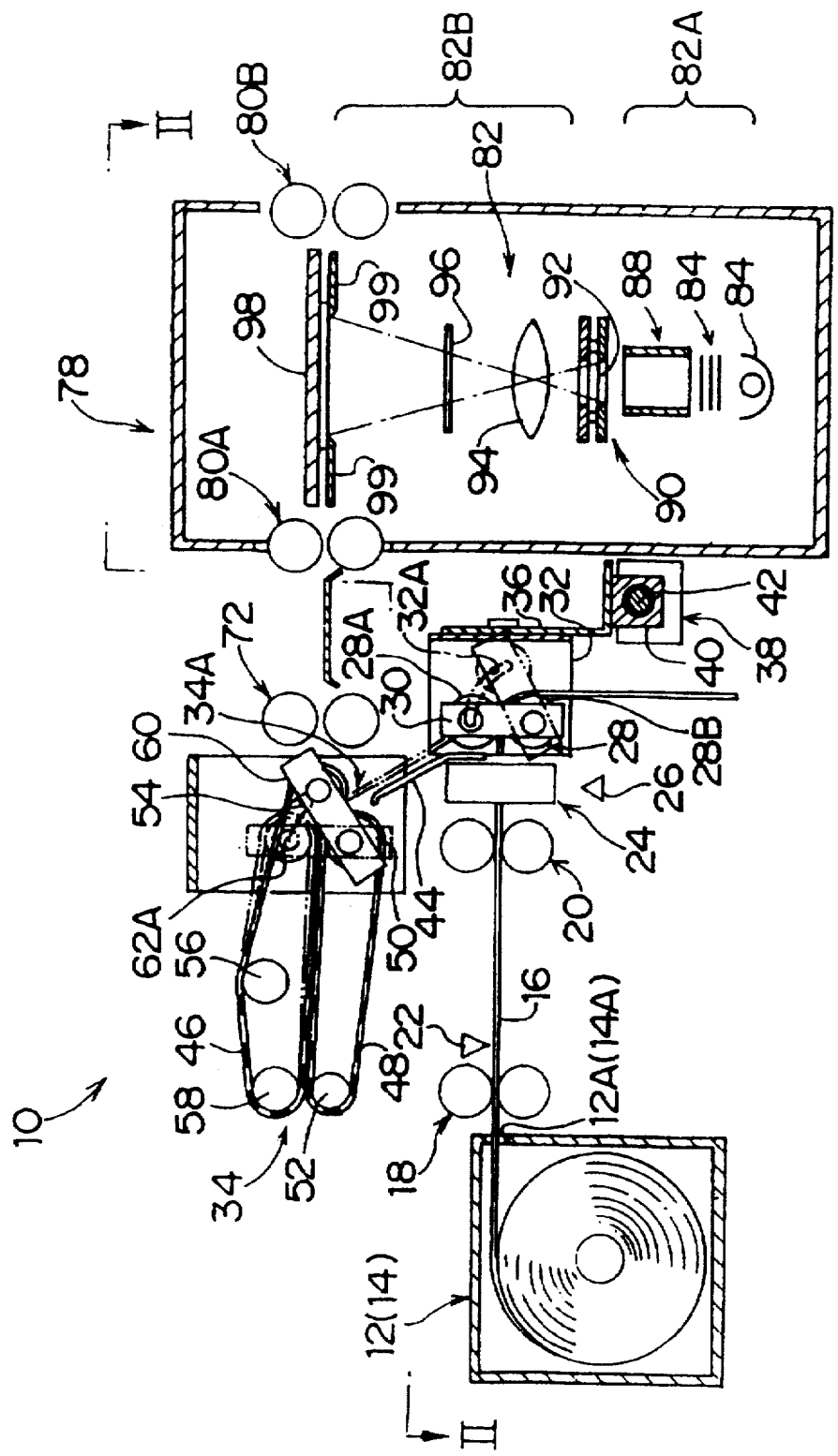
FIG. 1 is a schematic view which, seen from the side, shows a photographic processing apparatus relating to a first embodiment.
Figure 2A:
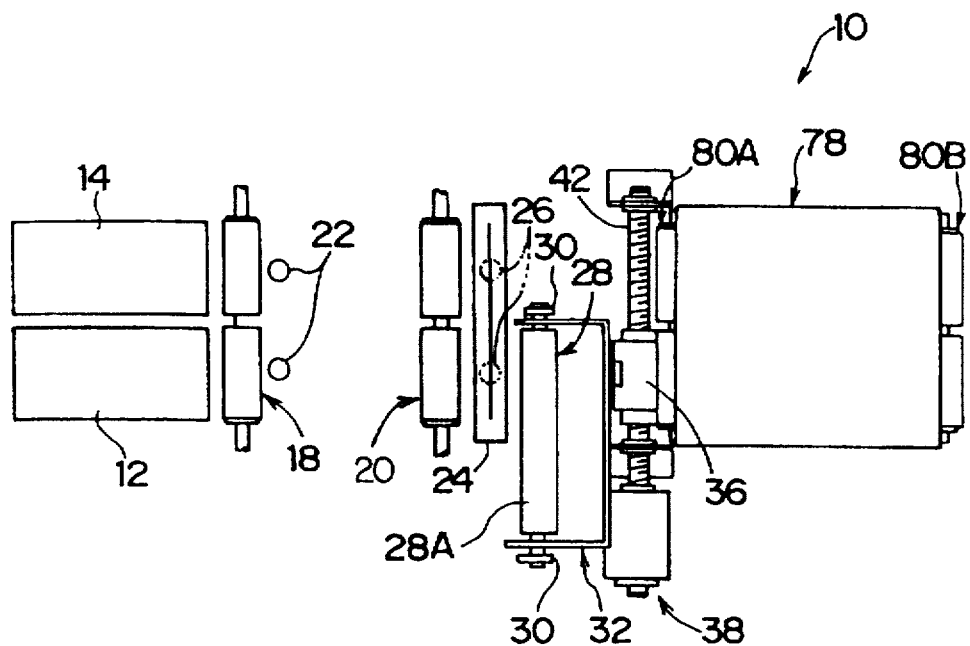
FIG. 2A is a plan view which, taken along line II—II of FIG. 1, shows a case in which a roller pair 28 is positioned at one (lower side) conveying path.
Figure 2B:
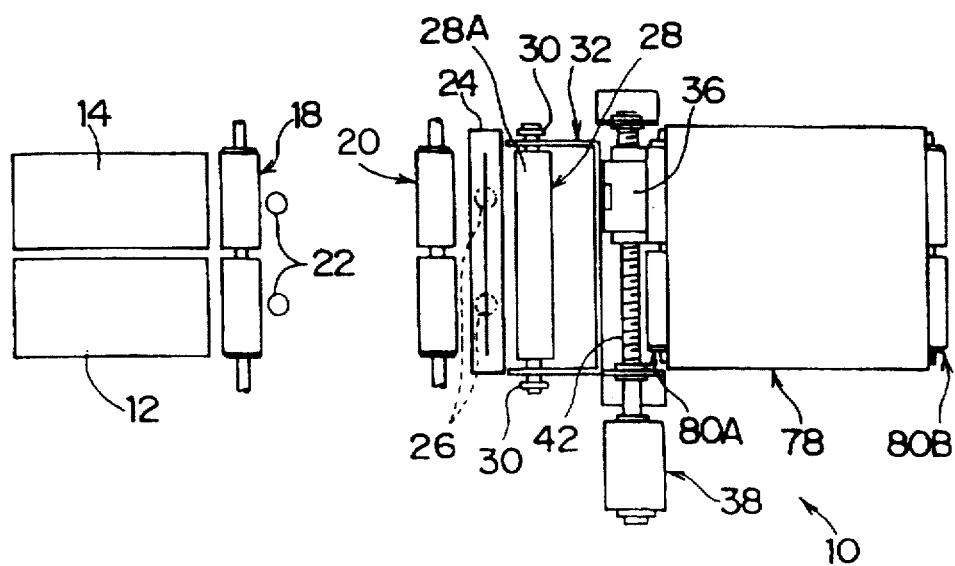
FIG. 2B is a plan view which, taken along line II—II of FIG. 1, shows a case in which the roller pair 28 is positioned at the other (upper side) conveying path.

FIGS. 1, 2A, and 2B show a photographic processing apparatus (a printer processor) 10 relating to a first embodiment. As shown in FIGS. 2A and 2B, two magazines 12, 14 can be disposed in a row in the printer processor 10. Photographic printing papers 16 are taken up in a layer-form and accommodated within the magazines 12, 14. The photographic printing papers 16 are successively withdrawn from withdrawing ports 12A, 14A, which are provided respectively at the magazines 12, 14, with the uppermost layer of the photographic printing layer 16 being the first.

Two roller pairs 18, 20 are provided at the downstream side of the withdrawing ports 12A, 14A of the magazines 12, 14 so as to nip and convey substantially horizontally the photographic printing paper 16, which has been withdrawn from the withdrawing ports 12A, 14A. Further, a sensor 22 is provided at the downstream side of the roller pair 18 disposed in the vicinity of the magazines 12, 14 so as to detect the existence of the photographic printing paper 16. In the first embodiment, the photographic printing paper 16 is withdrawn from the magazine 12 so as to be processed. When the photographic printing paper 16 from the magazine 12 is completely used, the photographic printing paper 16 in the other magazine 14 is used. The sensor 22 detects the end of the photographic printing paper 16 within the magazine 12 or 14. Further, as occasion demands, different widths and types of photographic printing papers 16 are accommodated within the magazines 12, 14. Accordingly, the photographic printing papers 16 can be switched and used appropriately.

A cutter portion 24 is provided in the vicinity of the further downstream side of the downstream roller pair. A sensor 26 is provided at the cutter portion 24 so as to correspond to the cut position of the photographic printing paper 16. When a predetermined time has passed since conveying of the distal end of the photographic printing paper 16, which has been cut by the cutter portion 24, starts, the photographic printing paper 16 is cut. In this way, a sheet which has a length corresponding to the predetermined time is obtained.

The photographic printing paper conveyed from the cutter portion 24 is nipped by the roller pair 28. The rotational shaft of an upper roller 28A of the roller pair 28 is axially supported at the longitudinal direction one side of a rectangular plate-shaped bracket 30. The rotational shaft of a lower roller 28B of the roller pair 28 is axially supported at the other side of the bracket 30.

Further, in a substantially U-shaped bracket 32 which has a pair of tripod plates, the roller pair 28 is suspended between the tripod plates. The rotational shaft of the upper roller 28A is accommodated within an arc-shaped elongated hole 32A provided at the tripod plates. As a result, the interval between the upper roller 28A and the lower roller 28B is maintained by the bracket 30, and the upper roller 28A can rotationally move along the arc-shaped elongated hole 32A.

The first position (see the position shown by a solid line in FIG. 1) is the one in which the upper roller 28A is positioned directly above the lower roller 28B and in which the photographic printing paper 16 conveyed from the cutter portion 24 is received. Moreover, the second position (see the position shown by a chain line in FIG. 1) is the one in which the upper roller 28A is positioned at the right end of the arc-shaped elongated hole 32A and in which the rear end side of the photographic printing paper 16 received from the cutter portion 24 is conveyed to a temporary accommodating portion 34 due to the reverse conveyance of the roller pair 28.

A moving bracket 36 is mounted to the back surface of the base of the bracket 32. The moving bracket 36 forms substantially the shape of an L and the horizontal lower portion thereof is fixed to a moving block 40 of a ball screw mechanical portion 38. As a result, as the shaft (the screw portion) 42 of the ball screw mechanical portion 38 is rotated, the roller pair 28 supported by the bracket 32 can be selectively corresponded to any one of the plurality of rows (two rows in the present embodiment) of conveying paths (see the positions in FIGS. 2A and 2B) (sorting of the photographic printing papers 16).

The temporary accommodating portion 34 is disposed above the aforementioned two sets of roller pairs 18, 20. The roller pair 28, which has received the photographic printing paper 16 from the cutter portion 24 at the first position, is moved to the second position. Then, the photographic paper 16 is guided by a guide plate 44 and conveyed to an entrance/exit port 34A of the temporary accommodating portion 34.

Figure 3:
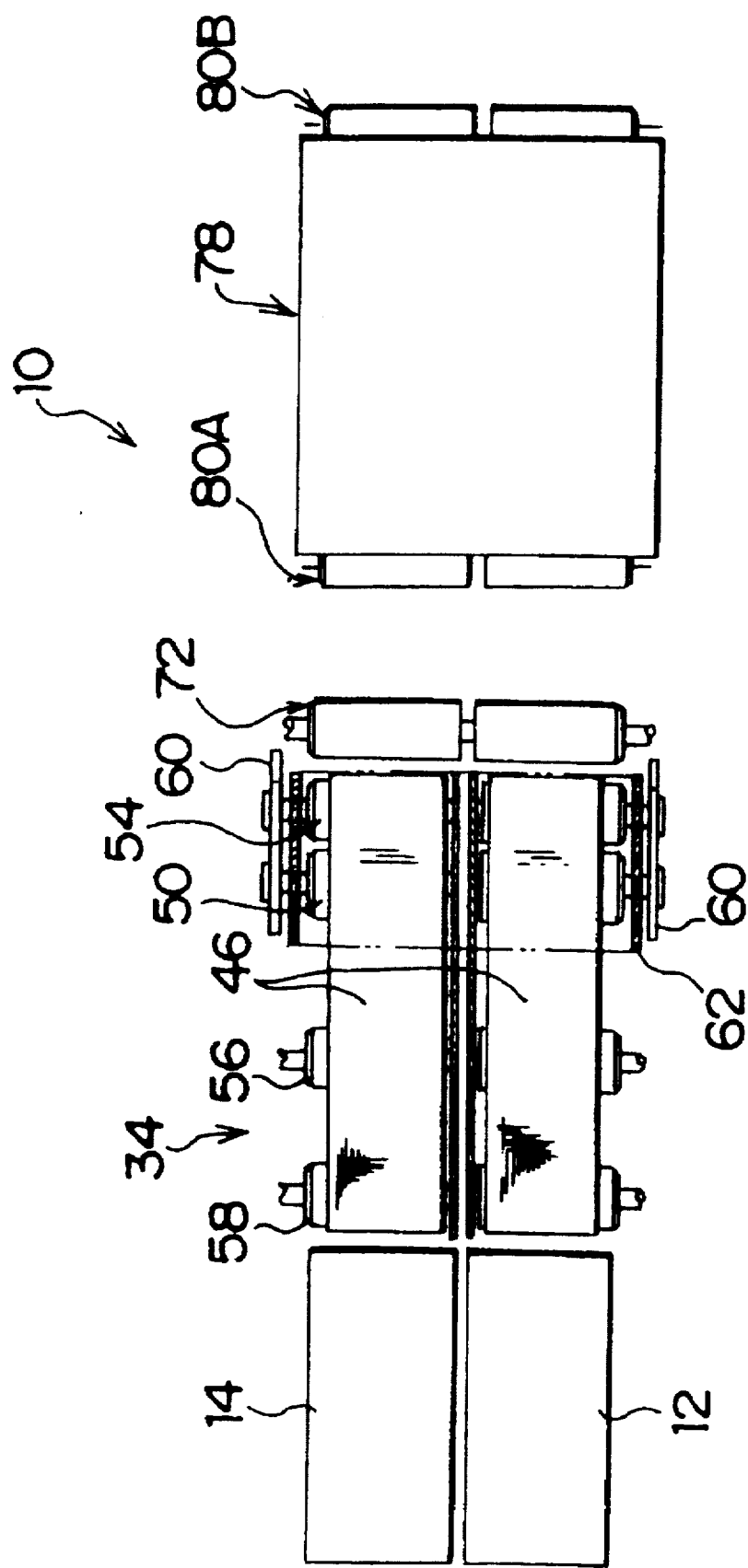
FIG. 3 is a schematic view which, seen from the top, shows the photographic processing apparatus relating to the first embodiment (a state in which a photographic printing paper is received at a temporary accommodating portion).
Figure 4:
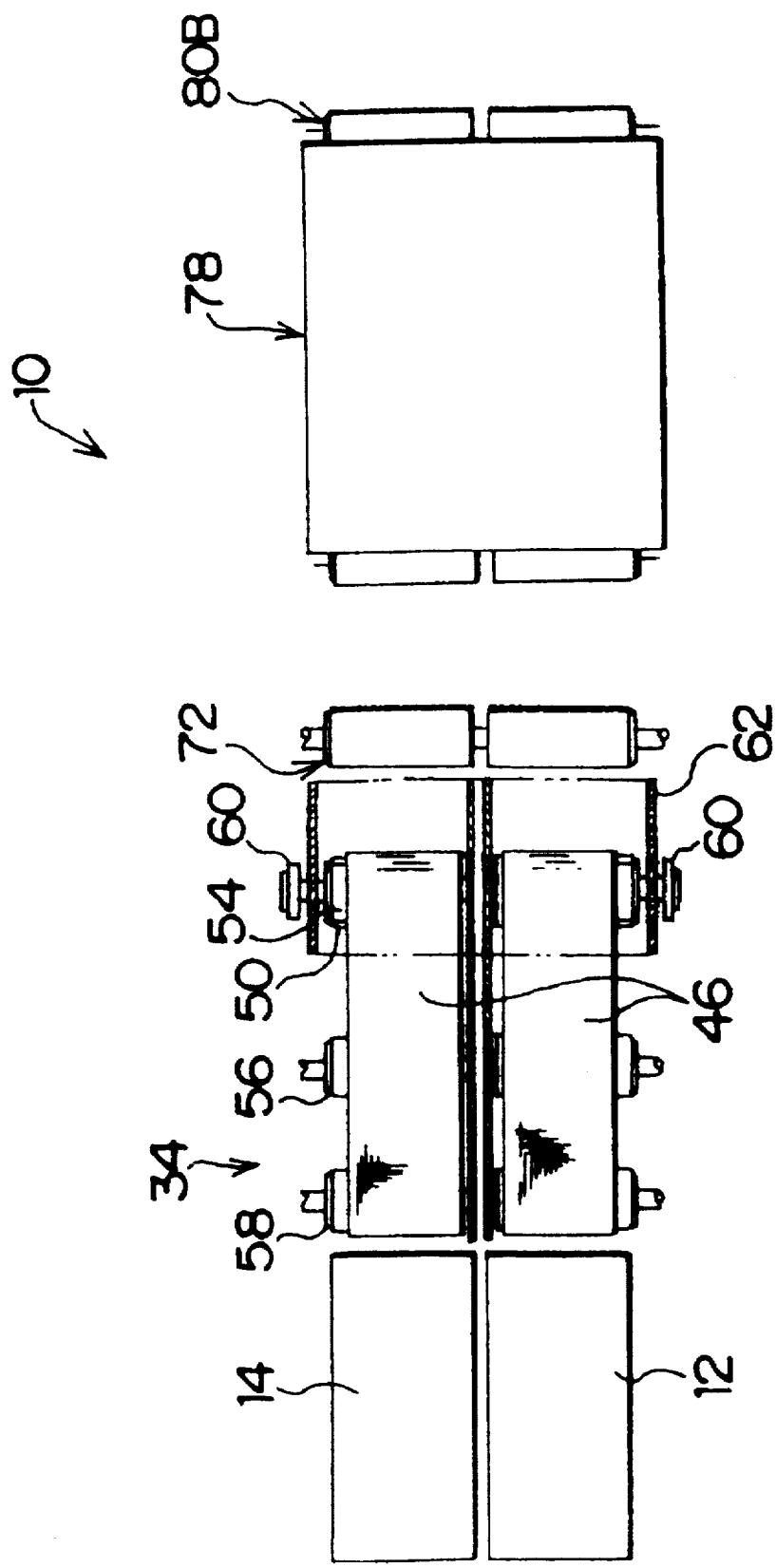
FIG. 4 is a schematic view which, seen from the top, shows the photographic processing apparatus relating to the first embodiment (a state in which the photographic printing paper is discharged from the temporary accommodating portion).

As shown in FIGS. 1, 3 and 4, the temporary accommodating portion 34 is formed by two pairs of belts 46, 48. The lower belt 48 is trained around two rollers 50, 52. Further, the upper belt conveyor 46 is trained around three rollers 54, 56, 58.

The rotational shaft of the roller 54 which supports the upper belt 46 on the right-hand side thereof in FIG. 1 is axially supported at the longitudinal direction one side of an elongated plate-shaped bracket 60. The rotational shaft of the roller 50 which supports the lower belt 48 on the right-hand side thereof in FIG. 1 is axially supported at the other side of the bracket 60.

Further, the rollers 54, 50 are suspended between a pair of tripod plates in a substantially U-shaped bracket. The rotational shaft of the upper roller 54 is accommodated within an arc-shaped elongated hole 62A provided at the tripod plates. As a result, the interval between the upper roller 54 and the lower roller 50 is maintained by the bracket 60, and the upper roller 54 can rotationally move along the arc-shaped elongated hole 62A.

The first position (see the position shown by a solid line in FIG. 1) is the one in which the upper roller 54 reaches the right end of the arc-shaped elongated hole 62A and in which the photographic printing paper 16 conveyed from the roller pair 28 is received. At this time, the photographic printing paper 16 is nipped between the belts 46, 48. The time between which the reverse conveyance of the roller pair 28 is started and the photographic printing paper 16 is held at the entrance/exit port 34 of the temporary accommodating portion 34 and is conveyed, is constant.

When it is recognized that the photographic printing paper 16 is nipped between the one row of belts 46, 48, the photographic printing paper 16 is conveyed so as to nip the other photographic printing paper 16 between the other row of belts 46, 48. Accordingly, the photographic printing papers 16 are conveyed from the magazine 12 and the sheet-formed photographic printing papers 16 are disposed at two rows of the conveying paths (between the belts 46 and 48).

The second position (see the position shown by a chain line in FIG. 1) is the one in which the upper roller 54 is positioned at the left end of the arc-shaped elongated hole 62A and in which the photographic printing paper 16 received from the roller pair 28 is conveyed to an exposure stage 78, which will be described later, due to the reverse conveyance of the belts 46, 48. When the photographic printing papers 16 are conveyed outwardly, the positions of the rear ends of the photographic printing papers 16 are invariably the same.

In the exposure stage 78, the photographic printing paper 16 conveyed from the aforementioned temporary accommodating portion 34 is held by the roller pair 80A disposed at the entrance of the exposure stage 78. The conveying linear velocity of the roller pair 80A is preferably the same as those of the belts 46, 48. However, as a one-way clutch is mounted to the respective rollers, around which the belts 46, 48 are trained, the conveying linear velocity of the roller pair 80A may be faster than those of the belts 46, 48.

A single exposure unit 82 is disposed at the exposure stage 78 so as to correspond to each of the conveying paths. A light source portion 82A of the exposure unit 82 is formed by a lamp 84, filters 86 of C(cyan), M(magenta), and Y(yellow), and a light diffusing cylinder 88. A light is illuminated onto a negative film 92 positioned by a negative carrier 90. When a shutter 96 is opened, the light transmitted through the negative film 92 reaches a paper carrier 98 via a lens 94 which is an optical system 82B. The photographic printing paper 16, which is held and conveyed by the roller pair 80A disposed at the above entrance, is positioned at the paper carrier 98. The exposure unit 82 is disposed at the center of the two conveying paths. As an optical axis is deflected by the lens 94, the exposure unit 82 can correspond to the photographic printing paper 16 on each of the conveying paths.

Variable masks 99 are provided on the paper carrier 98 (the lower surface side of the paper carrier 98 in FIG. 1) so that the exposure area of the photographic printing paper 16 is determined in accordance with the size thereof. The exposure unit 82 of the first embodiment is movable in the conveying direction of the photographic printing paper so as to correspond to each of the conveying paths. Because the rear ends of the photographic printing papers 16 are made uniform and conveyed, in a case in which the photographic printing papers 16 whose lengths are different between the two rows of conveying paths reach the exposure stage 78, the respective exposure axes are deviated to the left or right in FIG. 1. As a result, as the entire exposure unit 82 is moved, simultaneous exposure can be carried out.

The printed photographic printing papers 16 are simultaneously nipped and conveyed along the two rows of conveying paths by the roller pair 80B disposed at the exit side of the exposure stage 78. Then, the photographic printing papers 16 are discharged and conveyed to a development processing (unillustrated) which is a subsequent processing.

In the first embodiment, the following control of the conveyance timing is performed. Due to the conveyance timing, a wasteful standby time and incapability of process are minimized and an efficient processing is effected.

① The photographic printing papers 16 are sorted during the exposure process at the exposure stage 78.

② The photographic printing paper 16 is conveyed from the exposure stage 78 to a development processing section, and at the same time, the photographic printing paper 16 is conveyed from the temporary accommodating portion 34 to the exposure stage 78.

③ While one of the magazines 12, 14 is used, the other of the magazines 14, 12 is replaced.

④ As the rear ends of the photographic printing papers 16 are made uniform (mounting of the temporary accommodating portion 34), it is easier to sort the developed photographic printing papers 16.

The operation of the first embodiment will be explained hereinafter.

As shown in FIGS. 2A and 2B, the magazines 12, 14 are loaded so as to correspond to the two rows of conveying paths. In the work specification of the first embodiment, it is not necessary to load both of the magazines 12, 14 provided that at least one of the magazines 12 (or 14) being loaded and provided that the other of the magazines 14 (or 12) being loaded by the time in which the photographic printing paper 16 is removed from the loaded magazine 12 (or 14). Further, the widths and types of the photographic printing papers 16 accommodated within the magazines 12, 14 need not be the same, and the different types of photographic printing papers 16 may be used. Hereinafter, however, a description will be given of the flow of processing in which the same type of photographic printing papers 16 are accommodated.

When a processing procedure is described with reference to the conveying path, to which the magazine 12 is loaded, the roller pair 28 disposed at the downstream side of the cutter portion 24 is corresponded to the conveying path side of the magazine 12 by operating the ball screw mechanical portion 38. Moreover, the rotational shaft of the upper roller 28A of the roller pair 28 is positioned at the left end of the arc-shaped elongated hole, i.e., the first position. Hereinafter, in accordance with FIG. 1 and FIGS. 5A through 9B, the withdrawing procedure of the photographic printing paper 16 will be explained.

In a state in which the above-described initialization is completed, the photographic printing paper 16 (hereinafter, a first, a second, and a third photographic printing papers etc. will be respectively referred to as "a first photographic printing paper 16A", "a second photographic printing paper 16B", and "a third photographic printing paper 16C" etc. in the withdrawing order). The first withdrawn photographic printing paper 16 is conveyed horizontally (FIG. 5A) by the two sets of roller pairs 18, 20, passes the cutter portion 24, is nipped by the roller pair 28, and is suspended by self-weight with the support of the roller pair 28 (see the states shown in FIGS. 1 and 5B).

Figure 5A:
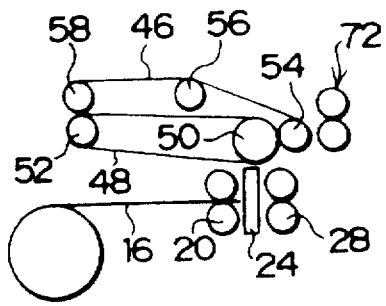
FIG. 5A is a schematic view which shows the procedure of accommodating the photographic printing paper within the temporary accommodating portion.
Figure 5B:
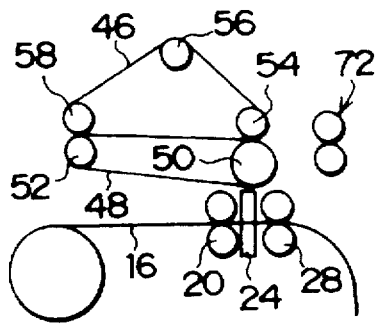
FIG. 5B is a schematic view which shows the procedure of accommodating the photographic printing paper within the temporary accommodating portion.
Figure 5C:
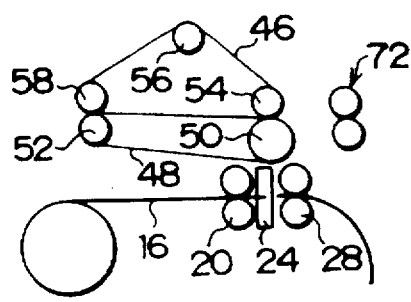
FIG. 5C is a schematic view which shows the procedure of accommodating the photographic printing paper within the temporary accommodating portion.
Figure 5D:
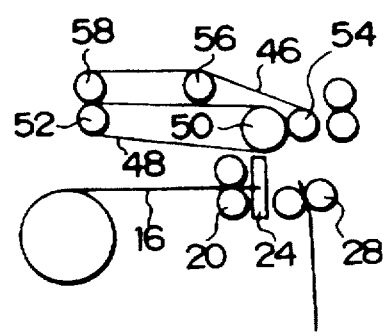
FIG. 5D is a schematic view which shows the procedure of accommodating the photographic printing paper within the temporary accommodating portion.
Figure 5E:
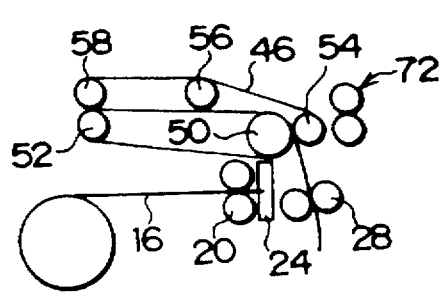
FIG. 5E is a schematic view which shows the procedure of accommodating the photographic printing paper within the temporary accommodating portion.
Figure 5F:
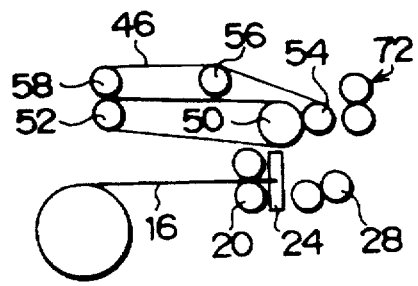
FIG. 5F is a schematic view which shows the procedure of accommodating the photographic printing paper within the temporary accommodating portion.
Figure 5G:
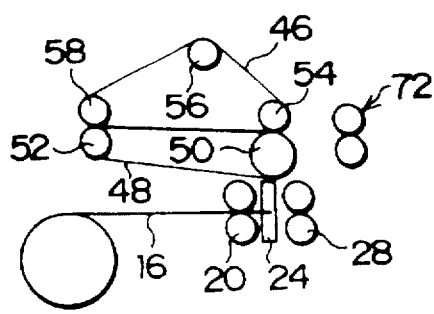
FIG. 5G is a schematic view which shows the procedure of accommodating the photographic printing paper within the temporary accommodating portion.

When the sensor 26 recognizes that the predetermined amount of the photographic printing paper 16 is withdrawn, the cutter portion 24 operates so as to cut the first photographic printing paper 16A (FIG. 5C). After the first photographic printing paper 16A is cut, the rotational shaft of the roller 28A is moved to the right end of the arc-shaped elongated hole 32A, i.e., the second position. In this way, the extension of the rear end of the first photographic printing paper 16A is directed to the direction of the temporary accommodating portion 34 (see the imaginary line in FIG. 1 and FIG. 5D).

Figure 6A:
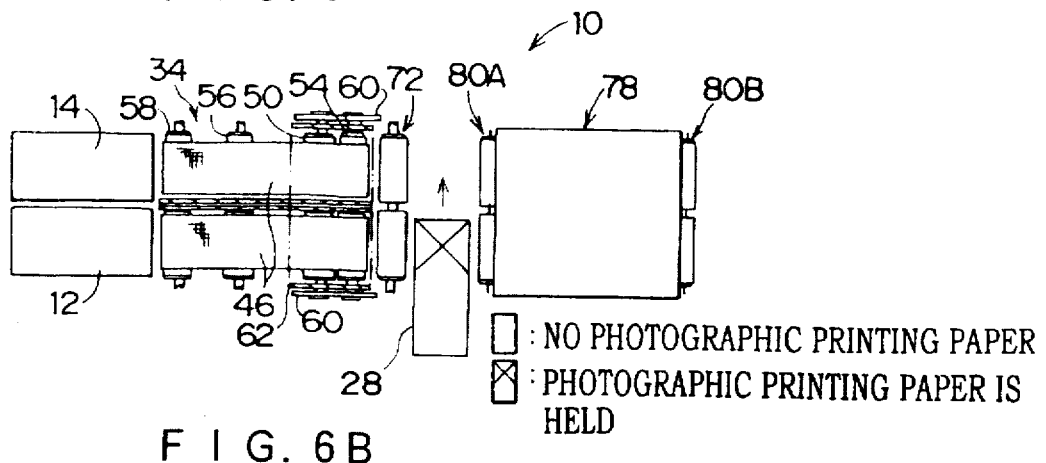
FIG. 6A is a schematic view which shows the procedure of conveying the photographic printing paper relating to the first embodiment.
Figure 6B:
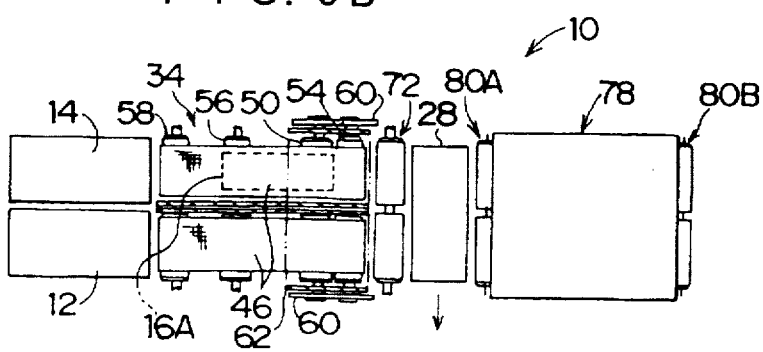
FIG. 6B is a schematic view which shows the procedure of conveying the photographic printing paper relating to the first embodiment.

When the ball screw mechanical portion 38 operates, the roller pair 28 starts to move so as to correspond to the other conveying path (the upper conveying path in FIGS. 2A and 2B) (see FIG. 6A). After the roller pair 28 corresponds to the other conveying path, the first photographic printing paper 16A is accommodated within the temporary accommodating portion 34 due to the reverse conveyance of the roller pair 28 (FIG. 5E), and the roller pair 28, which has delivered the first photographic printing paper 16A, (FIG. 5F) returns to the original conveying path (the lower side in FIGS. 2A and 2B) (see FIGS. 5G and 6B).

Figure 5H:
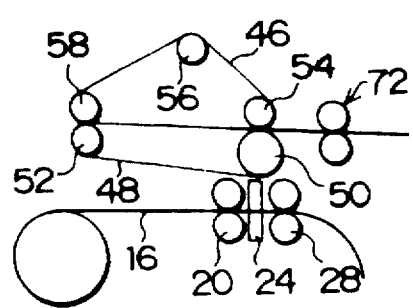
FIG. 5H is a schematic view which shows the procedure of accommodating the photographic printing paper within the temporary accommodating portion.
Figure 6C:
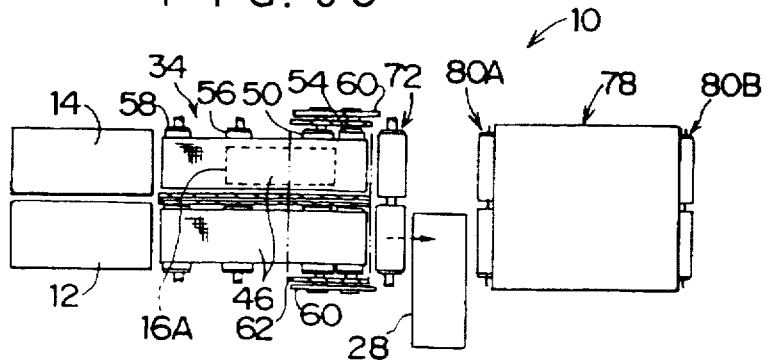
FIG. 6C is a schematic view which shows the procedure of conveying the photographic printing paper relating to the first embodiment.
Figure 6D:
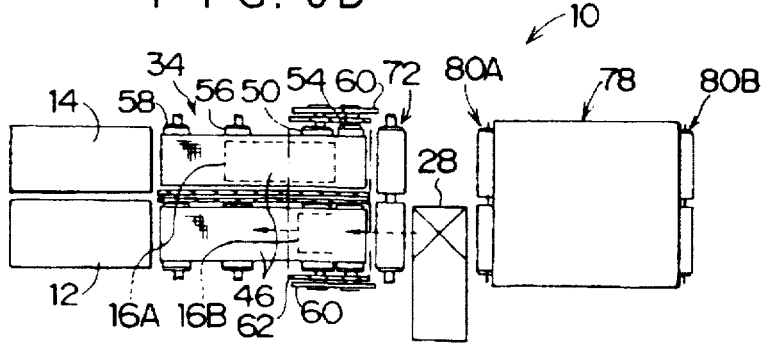
FIG. 6D is a schematic view which shows the procedure of conveying the photographic printing paper relating to the first embodiment.

When the roller pair 28 returns to the original conveying path, the roller pair 28 received the second photographic printing paper 16B (see FIGS. 5H and 6C). At the received position, the roller pair 28 continuously conveys the second photographic printing paper 16B to the temporary accommodating portion 34 (see FIG. 6D). After the second photographic printing paper 16B is delivered to the temporary accommodating portion 34, the first and second photographic printing papers 16A, 16B wait at the temporary accommodating portion 34 corresponding to the two rows of conveying paths (see FIG. 7A).

Next, both of the temporary accommodating portions 34 are simultaneously driven reversely, and the first and second photographic printing papers 16A, 16B held thereat are conveyed to the exposure stage 78. At the same time, the subsequent third photographic printing paper 16C is conveyed to the roller pair 28 (see FIG. 7B). While the first and second photographic printing papers 16A, 16B are conveyed to the exposure stage 78, the third photographic printing paper 16C received by the roller pair 28 starts to move transversely to the other conveying path side due to the operation of the ball screw mechanical portion 38 (see FIG. 7C).

When the first and second photographic printing papers 16A, 16B reach the exposure stage 78, exposure processing is effected. Because the rear ends of the first photographic printing paper 16A and the second photographic printing paper 16B are made uniform, when the sizes of the photographic printing papers 16A, 16B are different, the position of an optical axis is deviated. However, the exposure stage 78 is movable along the conveying direction of the photographic printing paper for the exposure unit 82 corresponding to each of the conveying paths. Thus, when the optical axis is set in advance on the basis of the size data of the photographic printing paper conveyed to the exposure stage 78, the two parallel photographic printing papers can be exposed simultaneously.

Figure 8A:
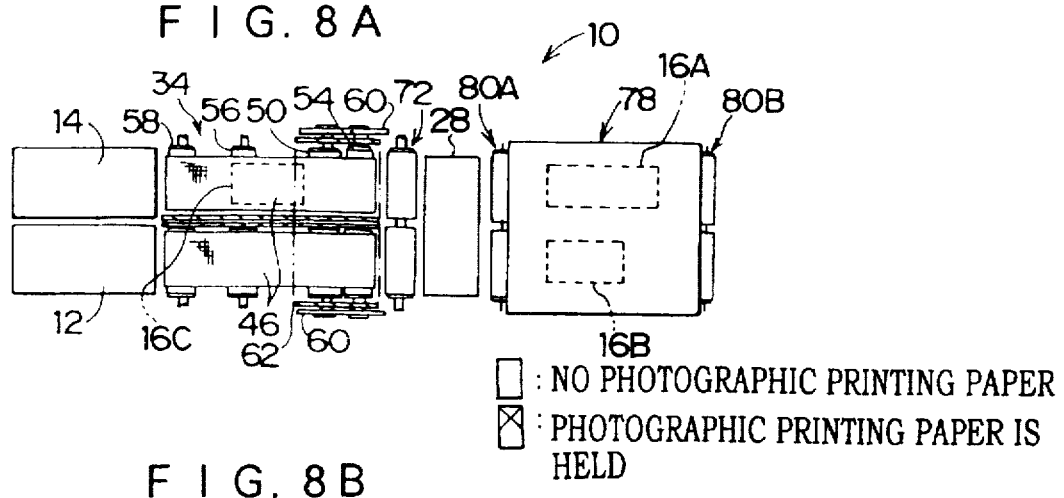
FIG. 8A is a schematic view which shows the procedure of conveying the photographic printing paper following FIG. 7D.
Figure 8B:
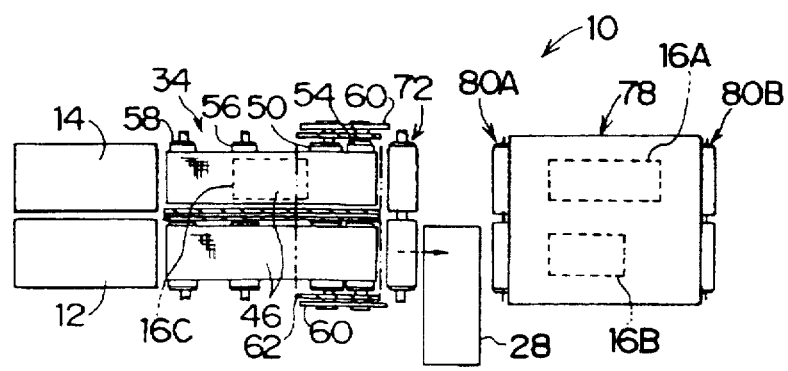
FIG. 8B is a schematic view which shows the procedure of conveying the photographic printing paper.
Figure 8C:
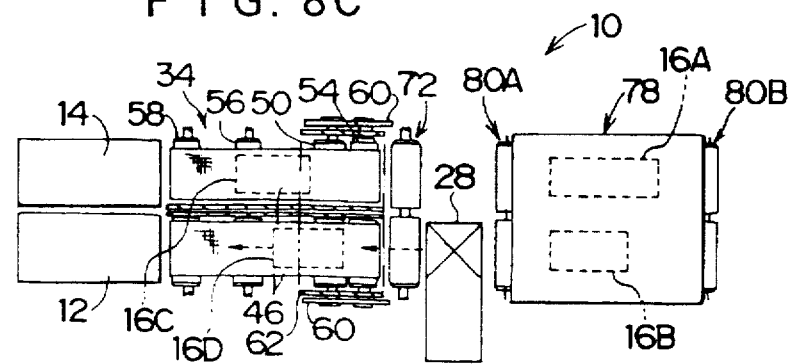
FIG. 8C is a schematic view which shows the procedure of conveying the photographic printing paper.
Figure 8D:
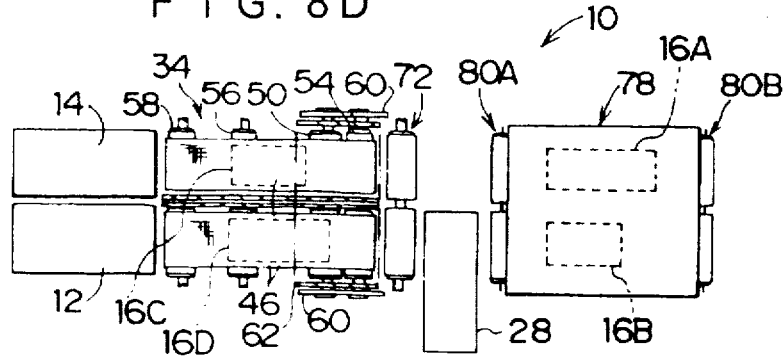
FIG. 8D is a schematic view which shows the procedure of conveying the photographic printing paper.

During the exposure process, the third photographic printing paper 16C is delivered to the temporary accommodating portion 34 from the roller pair 28 which has moved transversely (see FIG. 7D), and the roller pair 28 returns to the original conveying path (see FIG. 8A). The roller pair 28 receives the subsequent fourth photographic printing paper 16D (see FIG. 8B) and conveys the fourth photographic printing paper 16D to the temporary accommodating portion 34 corresponding to the original conveying path (see FIG. 8C). When the conveyance of the photographic printing paper 16D is completed, the third and fourth photographic printing papers 16C, 16D wait at the temporary accommodating portion 34 (see FIG. 8D). After the exposure processing of the first and second photographic printing papers 16A, 16B is completed at the exposure stage 78, the photographic printing papers 16A, 16B are conveyed to the development processing section, and at the same time, the third and fourth photographic printing papers 16C, 16D are conveyed to the exposure stage 78 from the temporary accommodating portion 34. Further, at the same time, the fifth photographic printing paper 16E is delivered to the roller pair 28 (see FIG. 9A), and subsequently, the roller pair 28 starts to move due to the operation of the ball screw mechanical portion 38 so that the fifth photographic printing paper 16E corresponds to the other conveying path (see FIG. 9B). Thereafter, i.e., after the sixth photographic printing paper (unillustrated), the processing which is the same as that of the operations from FIG. 7D onwards is repeated.

As the empty magazine 12 is replaced with the new one during the processing of the printing paper in the magazine 14, the magazine 12 can be replaced without interrupting the processing of the printing paper in the magazine 14 and the operational efficiency can be further improved. Moreover, since one of the magazes is replaceable until the photographic printing paper 16 has been consumed in the other of the magazines, there is no need for an operator to invariably monitor the replacement of the magazine. Furthermore, because it suffices if he/she monitors the replacement periodically at relatively long intervals, the workability in maintenance is improved.

Further, since the rear ends of the photographic printing papers 16 which are conveyed in parallel are made uniform, when the developed photographic printing papers 16 are sorted, it is easy to arrange the order of photographic printing papers 16. Namely, because the time in which the photographic printing paper 16 is discharged from the development processing is the same as that of the photographic printing paper 16 conveyed in parallel, as far as, for example, the belt conveyor is disposed in the direction orthogonal to the direction of conveyance in the development processing, the front and back of the photographic printing paper 16 on the belt conveyor is not reversed and the photographic printing papers 16 are arranged in the predetermined order of exposure.

Moreover, in order to demarcate films at the time of sorting thereof, the processed number of sheets of each film should be stored in a memory beforehand. However, when the content of the memory is deleted in case of blackout or the like, the demarcated position of the film is not found.

Consequently, in the first embodiment, as the position of the last photographic printing paper 16 is made different from the normal position thereof, the last photographic printing paper 16 is determined due to the changes in the position and the demarcation of films is effected.

Demarcation Determination Means 1

Figure 10A:
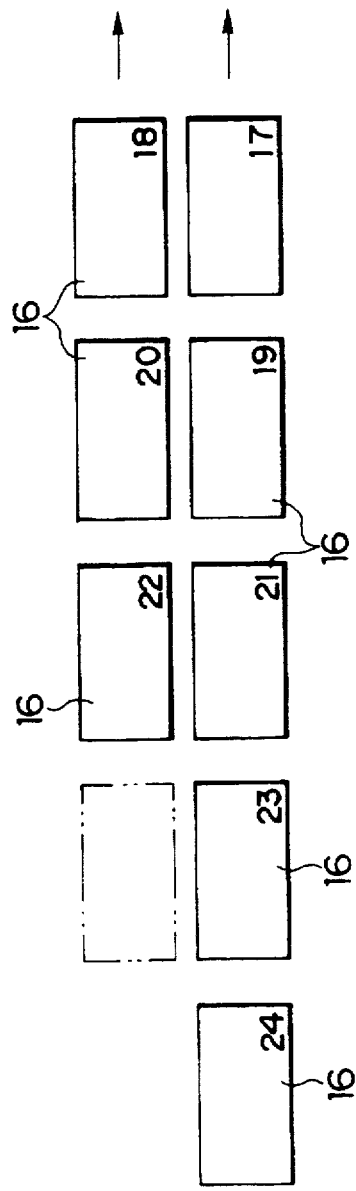
FIG. 10A is a schematic view which shows the conveying form for detecting demarcation of films at the time of sorting of each film in the first embodiment (two-row conveyance).
Figure 10B:
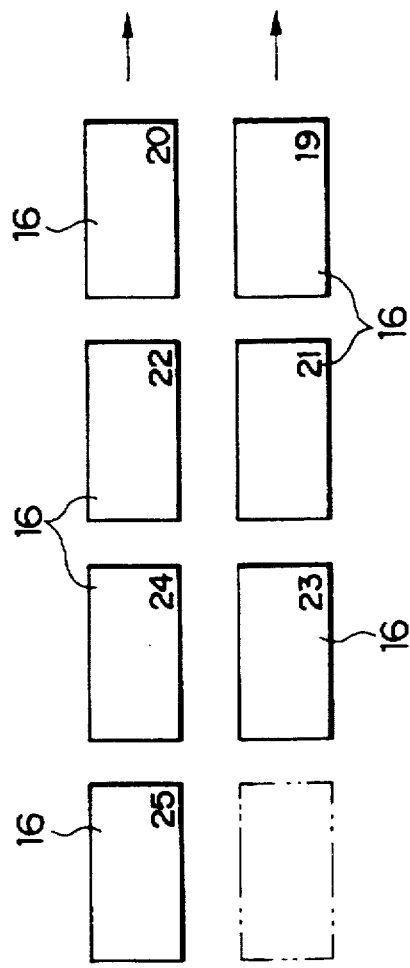
FIG. 10B is a schematic view which shows the conveying form for detecting demarcation of films at the time of sorting of each film in the first embodiment (two-row conveyance).
Figure 11A:
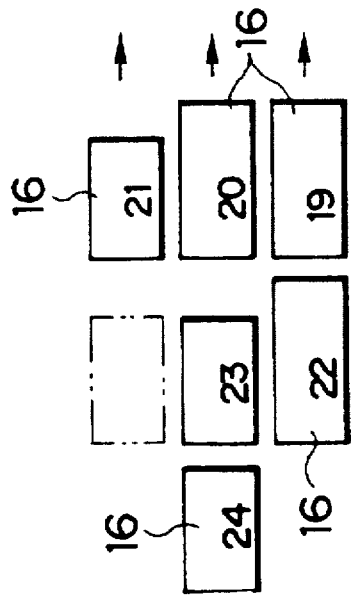
FIG. 11A is a schematic view which shows the conveying form for detecting demarcation of films at the time of sorting of each film in three-row conveyance (the conveying path of the last photographic printing paper is the same as that of the last but one photographic printing paper).
Figure 11B:
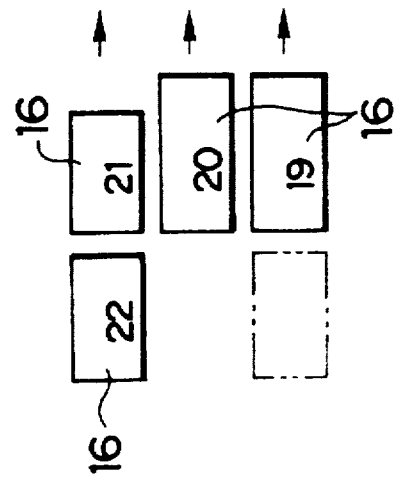
FIG. 11B is a schematic view which shows the conveying form for detecting demarcation of films at the time of sorting of each film in three-row conveyance (the conveying path of the last photographic printing paper is the same as that of the last but one photographic printing paper).
Figure 11C:
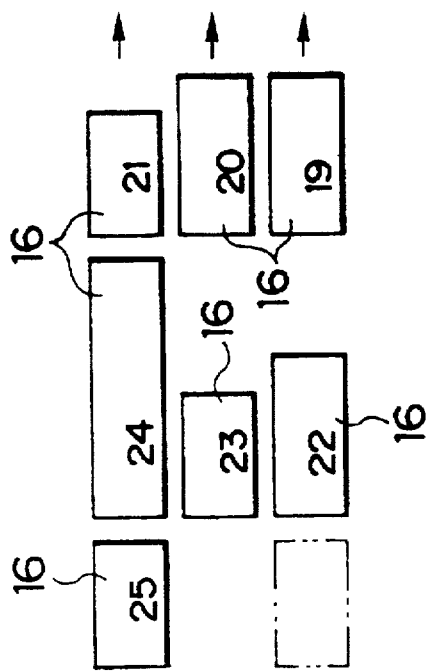
FIG. 11C is a schematic view which shows the conveying form for detecting demarcation of films at the time of sorting of each film in three-row conveyance (the conveying path of the last photographic printing paper is the same as that of the last but one photographic printing paper).
Figure 11D:
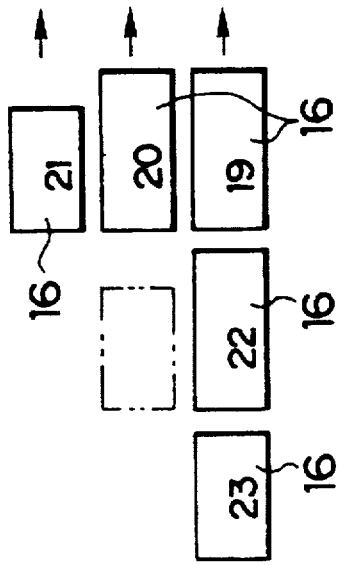
FIG. 11D is a schematic view which shows the conveying form for detecting demarcation of films at the time of sorting of each film in three-row conveyance (the conveying path of the last photographic printing paper is the same as that of the last but one photographic printing paper).

As shown in FIGS. 10A and 10B, normally, the photographic printing papers 16 are conveyed in parallel, developed, and sorted. At the time of sorting of the photographic printing papers 16, the last photographic printing paper 16 is processed in the conveying path which is the same as that of the last but one photographic printing paper. As a result, in a case in which the number of the photographic printing papers of a film is even, as shown in FIG. 10A, one-sheet processing is carried out in the last stage and the last but one stage. Thus, the original position of the last photographic printing paper 16 is in an unexposed state (see an imaginary line in FIG. 10A). As the unexposed state is detected by the apparatus, a borderline region between the films can be easily recognized.

On the other hand, in a case in which the number of photographic printing papers 16 is odd, as shown in FIG. 10B, the position of the photographic printing paper 16 in the last stage is different from the original position thereof (see an imaginary line in FIG. 10B) and the photographic printing paper 16 does not exist in the original position. As the non-existence is detected by the apparatus, a borderline region between the films can be easily recognized.

In the first embodiment, the two magazines 12, 14 are disposed in a row. However, a magazine which accommodates a wide photographic printing paper extending over two conveying paths can be loaded. In this case, there is no need to move the photographic printing paper transversely. Further, in the exposure stage 78, the exposure unit 82 may be moved in the transverse direction of the photographic printing paper or the optical axis may be inclined for exposure.

Furthermore, the number of conveying paths is not limited to two and may be three or more. In this case, the number of positions located by the ball screw mechanical portion 38 may be the same as that of conveying paths and the number of positions sorted by the portion 38 may be the same as that of conveying paths.

Sorting (demarcation of films) in the case of three rows of conveying paths will be explained in accordance with FIGS. 11A through 11D and FIGS. 12A through 12D.

In FIGS. 11A through 11D, the last photographic printing paper 16 is processed in the conveying path which is the same as that of the last but one photographic printing paper 16. Namely, in FIG. 11A, the twenty-fifth photographic printing paper is the last photographic printing paper 16. Because the last photographic printing paper 16 is processed in the conveying path which is the same as that of the twenty-fourth photographic printing paper, the last photographic printing paper 16 is processed at the position different from the original position (see an imaginary line in FIG. 11A) and is recognized by the apparatus. The same holds true for FIGS. 11B through 11D. As the last photographic printing papers 16 are processed at the positions different from the original positions (see imaginary lines in FIGS. 11B through 11D), the last photographic printing papers 16 can be recognized.

Figure 12A:
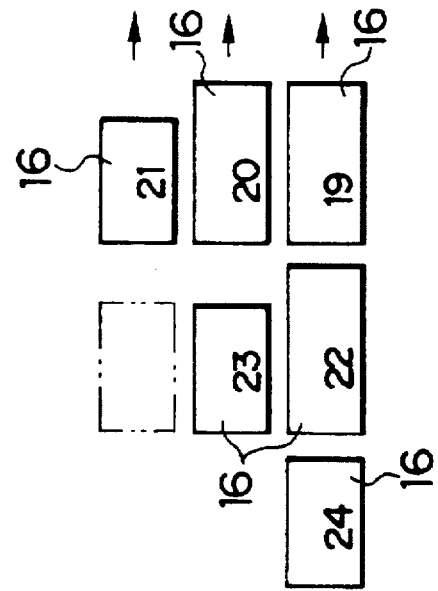
FIG. 12A is a schematic view which shows the conveying form for detecting demarcation of films at the time of sorting of each film in three-row conveyance (the conveying path of the last photographic printing paper is the one which skips the original position thereof).
Figure 12B:
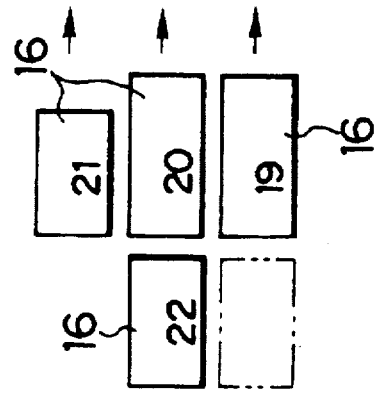
FIG. 12B is a schematic view which shows the conveying form for detecting demarcation of films at the time of sorting of each film in three-row conveyance (the conveying path of the last photographic printing paper is the one which skips the original position thereof).
Figure 12C:
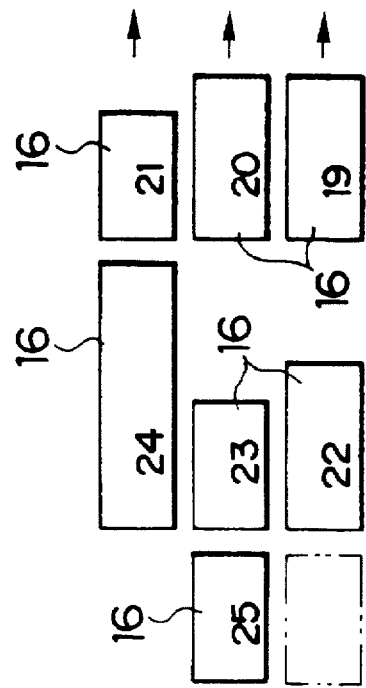
FIG. 12C is a schematic view which shows the conveying form for detecting demarcation of films at the time of sorting of each film in three-row conveyance (the conveying path of the last photographic printing paper is the one which skips the original position thereof).
Figure 12D:
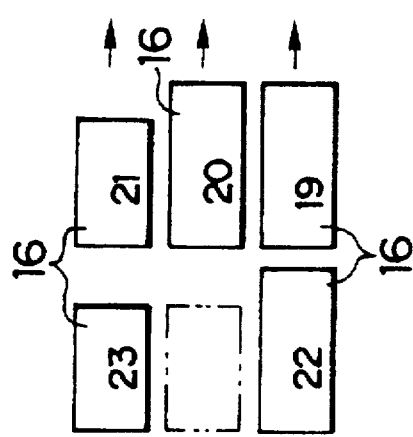
FIG. 12D is a schematic view which shows the conveying form for detecting demarcation of films at the time of sorting of each film in three-row conveyance (the conveying path of the last photographic printing paper is the one which skips the original position thereof).

Next, in FIGS. 12A through 12D, the last photographic printing paper 16 is loaded and processed on the conveying path which is one ahead of the original conveying path to be loaded. Namely, in FIG. 12A, the twenty-fifth photographic printing paper is the last photographic printing paper, and originally, the position shown by an imaginary line in FIG. 12A is the conveying path in which the last photographic printing paper 16 is loaded. However, the last photographic printing paper 16 is processed in the next conveying path which skips the original conveying path and recognized by the apparatus. The same holds true for FIGS. 12B through 12D. As the last photographic printing papers are processed at the positions different from the original positions (see imaginary lines in FIGS. 12B through 12D), the last photographic printing papers can be recognized.

In the first embodiment, one photographic printing paper 16 is accommodated within one magazine, however, two or more photographic printing papers (rolls) may be accommodated within one magazine. As far as the roll-shaped photographic printing papers are partitioned by shaded partitioning walls in the magazine, when one of the photographic printing papers is empty, the photographic printing paper can be replaced while the magazine is loaded.

Moreover, when the used magazine is replaced, it is necessary to change the printing conditions. Thus, before the photographic printing paper is delivered, a production lot number may be recorded at the distal end of the photographic printing paper by a bar code or the like. In this way, the bar code at the distal end of the photographic printing paper, which has been withdrawn from the selected magazine, is searched. In a case in which there is no bar code, the photographic printing paper is printed under the conditions which are the same as the previous ones. In a case in which a bar code is detected, the printing conditions corresponding to the bar code are read. In a case in which the printing conditions are read, the conditions are changed to the read printing conditions. In a case in which the printing conditions corresponding to the bar code are not read, the photographic printing paper is judged to be a new type. Therefore, a process of offering the printing conditions of a photographic printing paper is executed and the conditions may be registered.

Second Embodiment

In the above-described first embodiment, the temporary accommodating portion 34 is provided for making the rear ends of the photographic printing papers 16 uniform and the photographic printing papers 16 are conveyed from the temporary accommodating portion 34 to the exposure stage 78. However, as described in the following second embodiment, it is possible to have a structure in which the rear ends of the photographic printing papers 16 are not made uniform, the photographic printing papers 16 are withdrawn from the magazine 12 (or 14), the cut photographic printing papers 16 are sorted to each of the conveying paths, and thereafter, the photographic printing papers 16 are immediately conveyed to the exposure stage 78.

As shown in FIG. 13, two rows of conveying paths are formed so as to correspond to the magazines 12, 14. On each of the conveying paths, a feeding device 100, a cutter portion 102, a sorting device 104, an exposure stage 106, and a processing device 108 are provided in the above-described order.

The feeding device 100 is formed by a roller pair. The structure of the cutter portion 102 is the same as the structure thereof in the first embodiment. In the first embodiment, the photographic printing paper 16 is received by the sorting device 104 and conveyed inversely. However, in the second embodiment, the direction in which the photographic printing paper 16 is received by the sorting device 104 is the same as the direction in which the photographic printing paper 16 is subsequently conveyed to the exposure stage 106. For example, a belt which is driven in the direction normal to that of the conveying path may be provided, and when the photographic printing paper 16 is loaded on the belt, the belt is moved in the transverse direction thereof. Further, after the photographic printing paper 16 is sorted, the photographic printing paper 16 can be easily conveyed in the direction of exposure stage 106 by using a known semicircular roller.

Similarly to the first embodiment, in the exposure stage 106, the photographic printing paper 16 is planar-exposed by light transmitted through a negative film. The processing device 108 effects processing solution processing such as development, fixing, washing and the like and includes a drying process.

The processing procedure of conveying the photographic printing paper 16 will be described hereinafter.

Figure 13A:
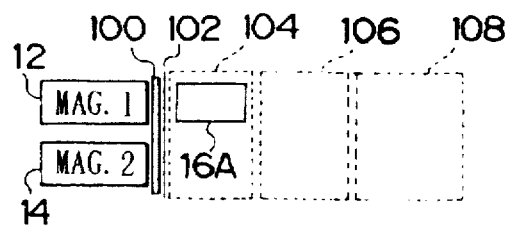
FIG. 13A is a schematic view which shows the procedure of conveying a photographic printing paper relating to a second embodiment.
Figure 13B:
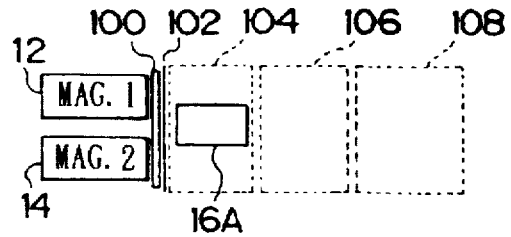
FIG. 13B is a schematic view which shows the procedure of conveying a photographic printing paper relating to the second embodiment.
Figure 13C:
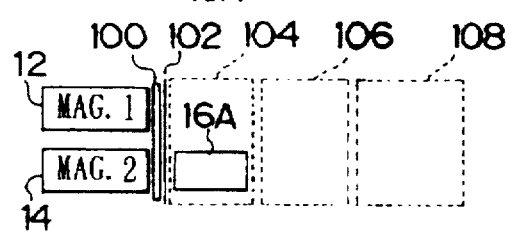
FIG. 13C is a schematic view which shows the procedure of conveying a photographic printing paper relating to the second embodiment.
Figure 13D:
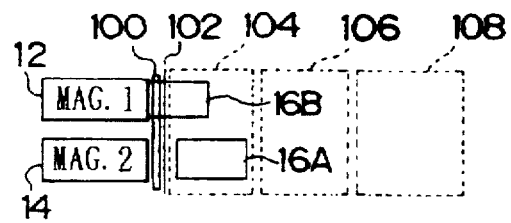
FIG. 13D is a schematic view which shows the procedure of conveying a photographic printing paper relating to the second embodiment.
Figure 13E:
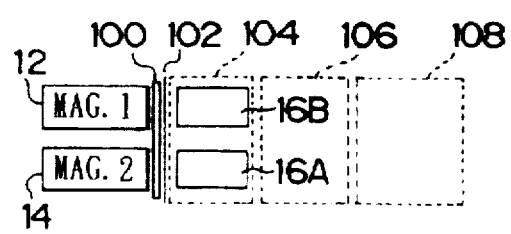
FIG. 13E is a schematic view which shows the procedure of conveying a photographic printing paper relating to the second embodiment.

As shown in FIG. 13A, when the first photographic printing paper 16A is withdrawn from one of the magazines 12, is cut at the cutter portion 102, and reaches the sorting device 104, the sorting device 104 operates such that the first photographic printing paper 16A is moved transversely to the other conveying path (see FIG. 13B).

When the first photographic printing paper 16A is transversely moved to the other conveying path (see FIG. 13C), the withdrawal of the subsequent second photographic printing paper 16B from the magazine 12 is started (see FIG. 13D) and the second photographic printing paper 16B reaches the sorting device 104. As a result, two photographic printing papers (the first and second photographic printing papers 16A, 16B) are disposed in a row in the sorting device 104 (see FIG. 13E).

Figure 13F:
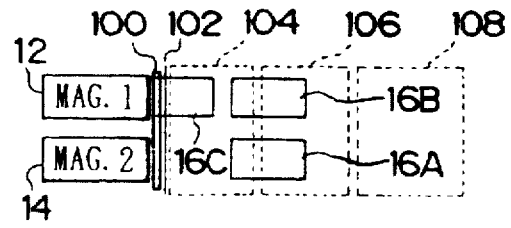
FIG. 13F is a schematic view which shows the procedure of conveying a photographic printing paper relating to the second embodiment.
Figure 13G:
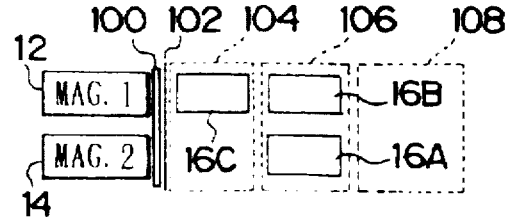
FIG. 13G is a schematic view which shows the procedure of conveying a photographic printing paper relating to the second embodiment.

The first and second photographic printing papers 16A, 16B are simultaneously conveyed to the exposure stage 106, and at the same time the third photographic printing paper 16C is withdrawn from the magazine 12 (see FIG. 13F). When the first and second photographic printing papers 16A, 16B reach the exposure stage 106, the third photographic printing paper 16C reaches the sorting device 104 (see FIG. 13G).

Figure 13H:
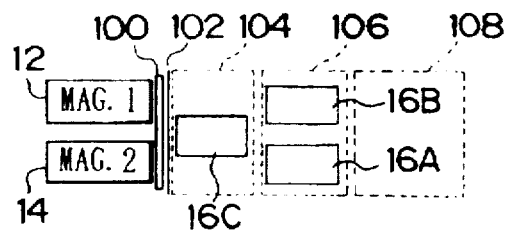
FIG. 13H is a schematic view which shows the procedure of conveying a photographic printing paper relating to the second embodiment.
Figure 13I:
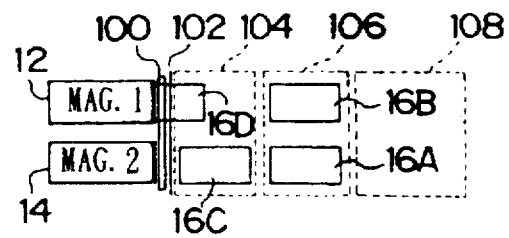
FIG. 13I is a schematic view which shows the procedure of conveying a photographic printing paper relating to the second embodiment.
Figure 13J:
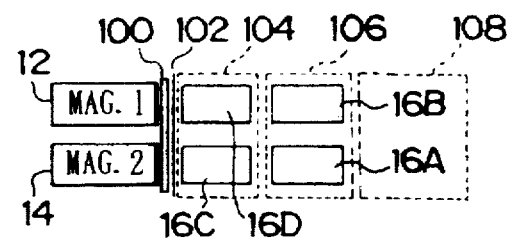
FIG. 13J is a schematic view which shows the procedure of conveying a photographic printing paper relating to the second embodiment.
Figure 13K:
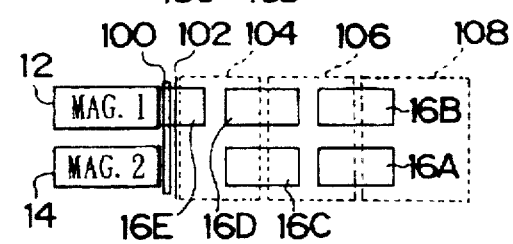
FIG. 13K is a schematic view which shows the procedure of conveying a photographic printing paper relating to the second embodiment.
Figure 13L:
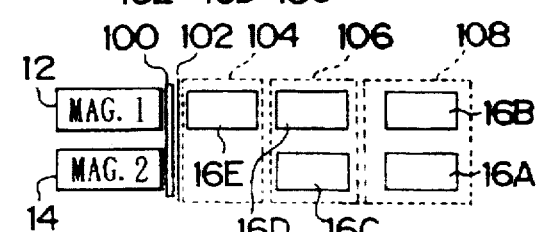
FIG. 13L is a schematic view which shows the procedure of conveying a photographic printing paper relating to the second embodiment.
Figure 13M:
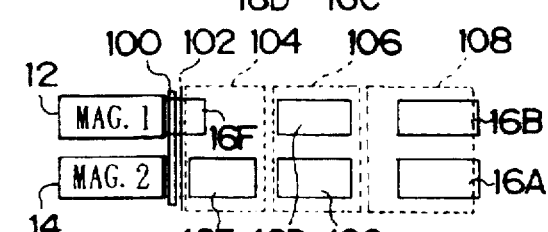
FIG. 13M is a schematic view which shows the procedure of conveying a photographic printing paper relating to the second embodiment.

During the exposure processing at the exposure stage 106, the third photographic printing paper 16C is transversely moved by the sorting device 104 (see FIG. 13H). When the third photographic printing paper 16C reaches the other conveying path, the withdrawal of the fourth photographic printing paper 16D from the magazine 12 is simultaneously started (see FIG. 13I)

When the fourth photographic printing paper 16D reaches sorting device 104 (see FIG. 13J), the exposure processing at the exposure stage 106 is completed, and the conveyance of the first and second photographic printing papers 16A, 16B to the processing device 108 is started. At the same time, the conveyance of the third and fourth photographic printing papers 16C, 16D is started. Furthermore, at the same time, the withdrawal of the fifth photographic printing paper 16E from the magazine 12 is started (see FIG. 13K).

During the above exposure processing of the third and fourth photographic printing papers 16C, 16D, the fifth photographic printing paper 16E reaches the sorting device 104 and moves transversely (see FIG. 13L), the withdrawal of the sixth photographic printing paper 16F is started (see FIG. 13M), and the fifth and sixth photographic printing papers 16E, 16F reach the sorting device 104. In the meantime, it is desirable that the processing of the first and second photographic printing papers 16A, 16B at the processing device 108 be completed.

Figure 13N:
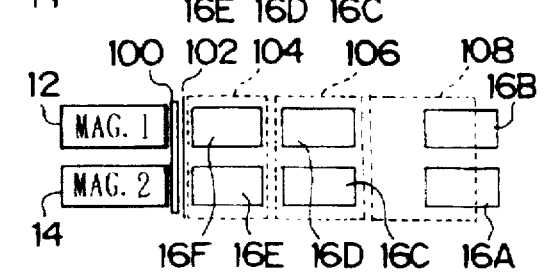
FIG. 13N is a schematic view which shows the procedure of conveying a photographic printing paper relating to the second embodiment.

Next, as shown in FIG. 13N, when the discharge of the first and second photographic printing papers 16A, 16B from the processing device 108 is started, simultaneously and thereafter, the third and fourth photographic printing papers 16C, 16D are discharged from the exposure stage 106, the fifth and sixth photographic printing papers 16E, 16F are discharged from the sorting device 104, and the seventh photographic printing paper (unillustrated) is withdrawn from the magazine 12 (the processing procedure shown in FIGS. 13K through 13N is repeated).

In the second embodiment, a so-called analog exposure, i.e., a transmitted light from the negative film is planar-exposed onto the exposure stage 106, is effected. However, as shown in FIG. 14, a slit 106D is provided at an exposure stage 106A by two sets of rollers 106B, 106C in a direction normal to that of the conveying path and a so-called digital exposure may be effected by using a laser beam which scans along the slit 106D. In this case, the constant-velocity conveyance of the photographic printing paper 16 serves as sub-scanning, and the scanning of the laser beam along the slit 106D serves as main scanning.

When an image is recorded by a laser beam, it is possible to use a general exposure system in which the light irradiated from a semiconductor laser 106G is deflected in the main scanning direction by a polygon mirror 106E and in which aberration or the like is corrected by an fθ lens 106F.

Figure 15A:
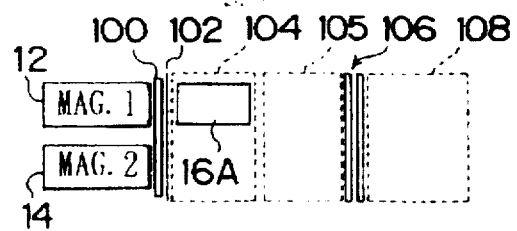
FIG. 15A is a schematic view which shows the procedure of conveying a photographic printing paper relating to a variant example of the second embodiment.
Figure 15B:
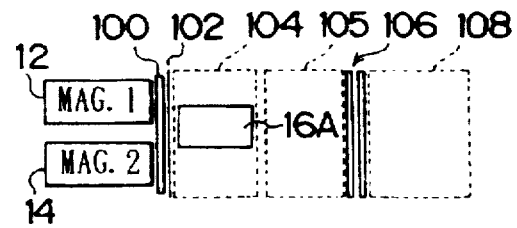
FIG. 15B is a schematic view which shows the procedure of conveying a photographic printing paper relating to the variant example of the second embodiment.
Figure 15C:
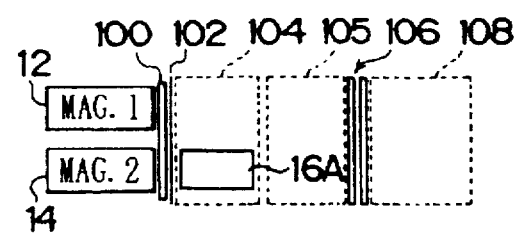
FIG. 15C is a schematic view which shows the procedure of conveying a photographic printing paper relating to the variant example of the second embodiment.
Figure 15D:
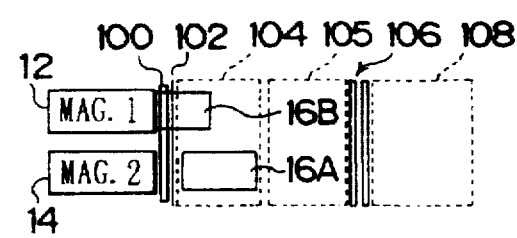
FIG. 15D is a schematic view which shows the procedure of conveying a photographic printing paper relating to the variant example of the second embodiment.
Figure 15E:
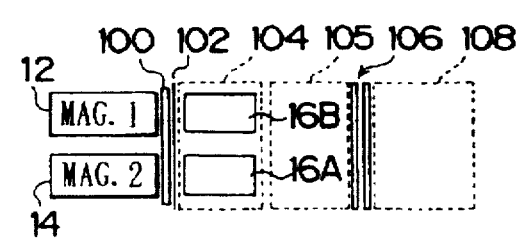
FIG. 15E is a schematic view which shows the procedure of conveying a photographic printing paper relating to the variant example of the second embodiment.
Figure 15F:
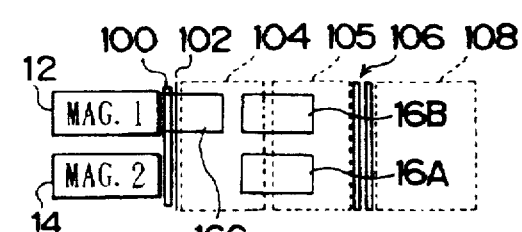
FIG. 15F is a schematic view which shows the procedure of conveying a photographic printing paper relating to the variant example of the second embodiment.
Figure 15G:
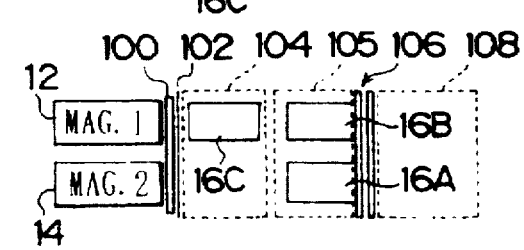
FIG. 15G is a schematic view which shows the procedure of conveying a photographic printing paper relating to the variant example of the second embodiment.
Figure 15H:
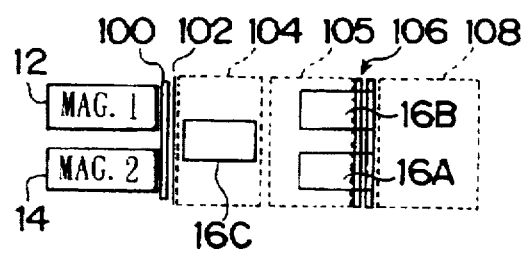
FIG. 15H is a schematic view which shows the procedure of conveying a photographic printing paper relating to the variant example of the second embodiment.
Figure 15I:
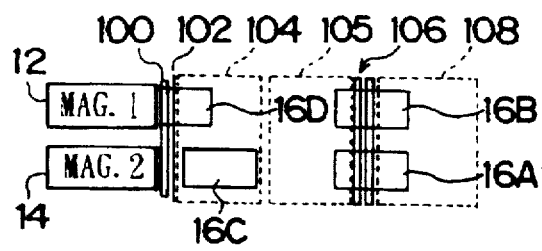
FIG. 15I is a schematic view which shows the procedure of conveying a photographic printing paper relating to the variant example of the second embodiment.
Figure 15J:
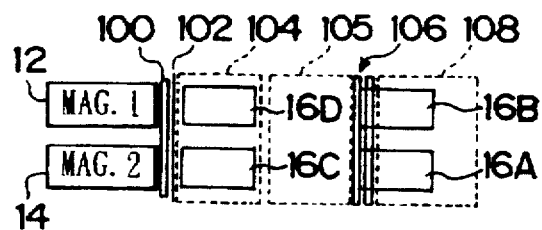
FIG. 15J is a schematic view which shows the procedure of conveying a photographic printing paper relating to the variant example of the second embodiment.
Figure 15K:
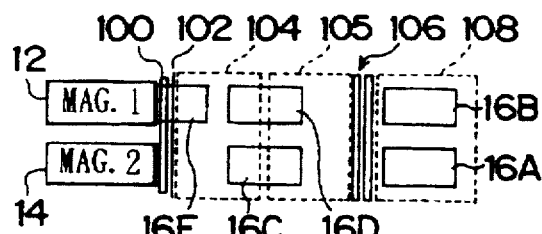
FIG. 15K is a schematic view which shows the procedure of conveying a photographic printing paper relating to the variant example of the second embodiment.
Figure 15L:
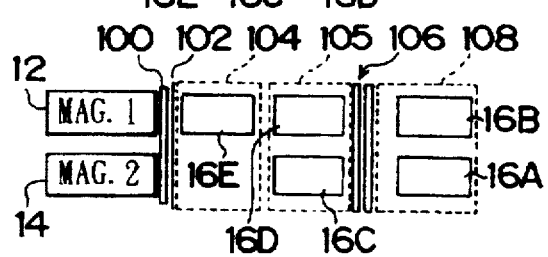
FIG. 15L is a schematic view which shows the procedure of conveying a photographic printing paper relating to the variant example of the second embodiment.
Figure 15M:
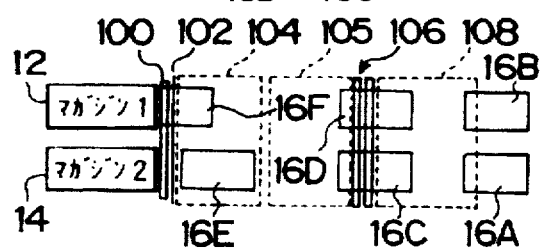
FIG. 15M is a schematic view which shows the procedure of conveying a photographic printing paper relating to the variant example of the second embodiment.
Figure 15N:
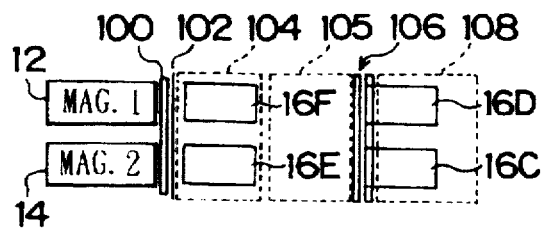
FIG. 15N is a schematic view which shows the procedure of conveying a photographic printing paper relating to the variant example of the second embodiment.

The processing procedure in FIGS. 15A through 15N corresponds to the processing procedure in FIGS. 13A through 13N. The processing procedure in FIGS. 15A through 15N differs from that in the second embodiment (FIGS. 13A through 13N) in that a photographic printing paper is not halted in the exposure stage 106. Although it is not essential, in the variant example of the second embodiment, a buffer 105 is provided between the sorting device 104 and the exposure stage 106 so as to consider the respective processing times of sorting, exposure, and development.

Third Embodiment

The first and second embodiments are described by using the two magazines 12, 14 and the two rows of conveying paths. As mentioned above, it is not necessary that the number of magazines be the same as the number of conveying paths. In the third embodiment, a processing procedure will be described by using the structure of two magazines and three rows of conveying paths as an example. In the third embodiment, digital exposure is carried out in an exposure stage. Since the other structure is the same as that of the second embodiment, the description thereof is omitted.

In FIGS. 16A through 16G, photographic printing papers 16 (the first through third photographic printing papers 16A, 16B, 16C) are withdrawn one by one from a magazine 12 and arranged in a row by a sorting device 104.

Figure 16A:
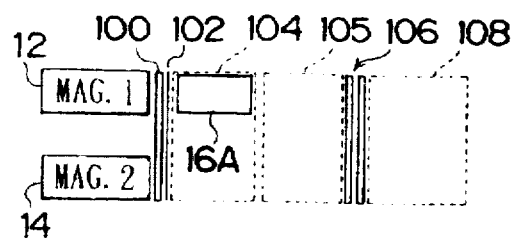
FIG. 16A is a schematic view which shows the procedure of conveying a photographic printing paper relating to a third embodiment.
Figure 16B:
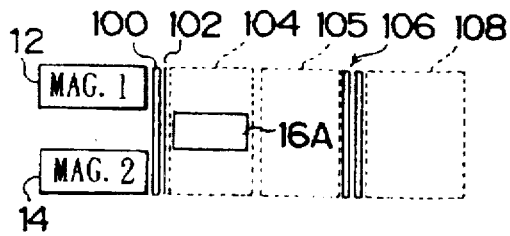
FIG. 16B is a schematic view which shows the procedure of conveying a photographic printing paper relating to the third embodiment.
Figure 16C:
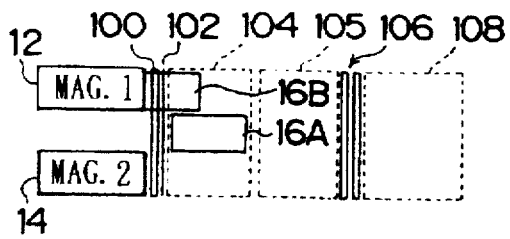
FIG. 16C is a schematic view which shows the procedure of conveying a photographic printing paper relating to the third embodiment.
Figure 16D:
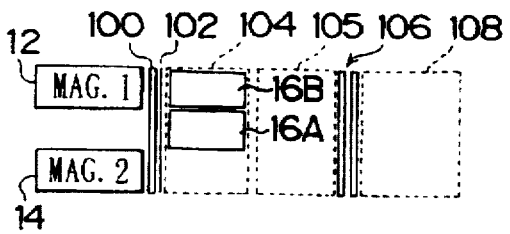
FIG. 16D is a schematic view which shows the procedure of conveying a photographic printing paper relating to the third embodiment.
Figure 16E:
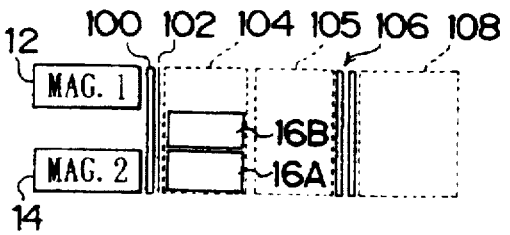
FIG. 16E is a schematic view which shows the procedure of conveying a photographic printing paper relating to the third embodiment.
Figure 16F:
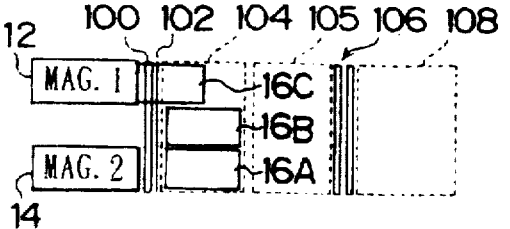
FIG. 16F is a schematic view which shows the procedure of conveying a photographic printing paper relating to the third embodiment.
Figure 16G:
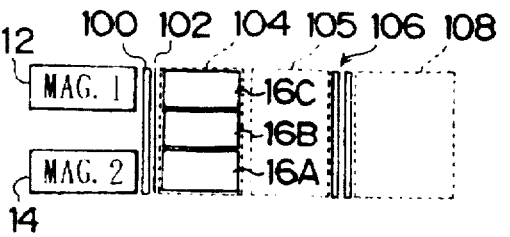
FIG. 16G is a schematic view which shows the procedure of conveying a photographic printing paper relating to the third embodiment.
Figure 16H:
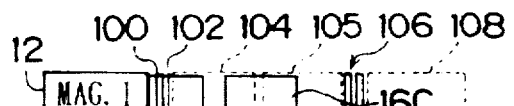
FIG. 16H is a schematic view which shows the procedure of conveying a photographic printing paper relating to the third embodiment.
Figure 16I:
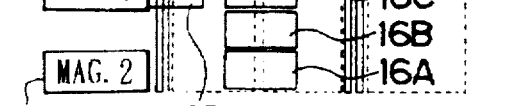
FIG. 16I is a schematic view which shows the procedure of conveying a photographic printing paper relating to the third embodiment.
Figure 16J:
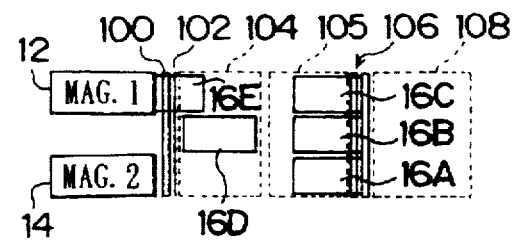
FIG. 16J is a schematic view which shows the procedure of conveying a photographic printing paper relating to the third embodiment.
Figure 16K:
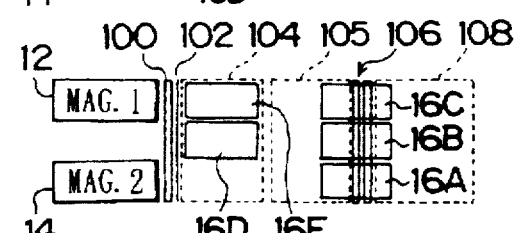
FIG. 16K is a schematic view which shows the procedure of conveying a photographic printing paper relating to the third embodiment.
Figure 16L:
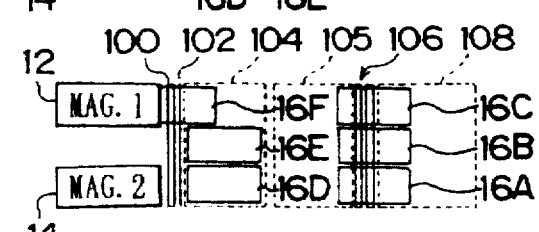
FIG. 16L is a schematic view which shows the procedure of conveying a photographic printing paper relating to the third embodiment.
Figure 16M:
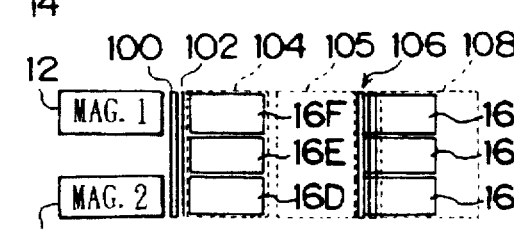
FIG. 16M is a schematic view which shows the procedure of conveying a photographic printing paper relating to the third embodiment.
Figure 16N:
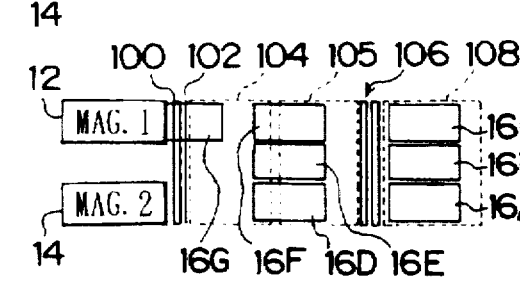
FIG. 16N is a schematic view which shows the procedure of conveying a photographic printing paper relating to the third embodiment.

When the three photographic printing papers (the first through third photographic printing papers 16A, 16B, 16C) are disposed in a row, the photographic printing papers are simultaneously moved to a buffer 105. At the same time, the withdrawal of the fourth photographic printing paper 16D from the magazine 12 is started (see FIG. 16H).

The first through third photographic printing papers 16A, 16B, 16C, which have been moved to the buffer 105 all together, are started to move to an exposure stage 106 so as to be subjected to scan-exposure. Further, during the scan-exposure, the fourth, the fifth, and the sixth photographic printing papers 16D, 16E, 16F are withdrawn and moved transversely by the sorting device 104 (see FIGS. 16I through 16M). Next, when the scan-exposure at the exposure stage 106 is completed, the fourth through sixth photographic printing papers 16D, 16E, 16F are conveyed to the buffer 105 all at once, and the seventh photographic printing paper 16G is simultaneously withdrawn from the magazine 12.

Due to the repetition of these processings, three photographic printing papers can be processed simultaneously, efficiently and rapidly.

What is claimed is:

1. A photosensitive material processing method, in which a sheet-formed photosensitive material, which has been cut to predetermined sizes, is conveyed to an exposure stage and processed, wherein:

the exposure stage has a function of exposing simultaneously a plurality of sheet-formed photosensitive materials, and at the upstream of the exposure stage, the photosensitive materials are sorted and conveyed so as to be able to be exposed simultaneously; and wherein said sorting is effected on the conveying paths at the upstream of the exposure stage, and the photosensitive materials are sorted in the direction normal to the conveying directions of the photosensitive materials.

2. A photosensitive material processing method according to claim 1, wherein the photosensitive materials are accommodated elongatedly within a plurality of magazines which are disposed in a row in the direction normal to the directions of the conveying paths, and the photosensitive materials are selectively withdrawn from the magazines, cut to predetermined sizes, and thereafter, sorted.

3. A photosensitive material processing method according to claim 1, wherein the time in which the photosensitive materials are sorted to the conveying paths is one of shorter than and equal to the time in which the photosensitive materials are exposed at the exposure stage.

4. A photosensitive material processing method according to claim 1, wherein when the photosensitive materials are conveyed, the rear ends of the photosensitive materials are made uniform.

5. A photosensitive material processing method, in which a sheet-formed photosensitive material, which has been cut to predetermined sizes, is conveyed to an exposure stage and processed, wherein:

the exposure stage has a function of exposing simultaneously a plurality of sheet-formed photosensitive materials, and at the upstream of the exposure stage, the photosensitive materials are sorted and conveyed so as to be able to be exposed simultaneously; and wherein the photosensitive materials are accommodated elongatedly within a plurality of magazines which are disposed in a row in the direction normal to the directions of the conveying paths, and the photosensitive materials are selectively withdrawn from the magazines, cut to predetermined sizes, and thereafter, sorted.

6. A photosensitive material processing method according to claim 5, wherein the photosensitive materials are supplied from the magazines to the conveying paths, and simultaneously, the photosensitive materials are conveyed to the exposure stage.

7. A photosensitive material processing method according to claim 5, wherein the time in which the photosensitive materials are sorted to the conveying paths is one of shorter than and equal to the time in which the photosensitive materials are exposed at the exposure stage.

8. A photosensitive material processing method according to claim 6, wherein the time in which the photosensitive materials are sorted to the conveying paths is one of shorter than and equal to the time in which the photosensitive materials are exposed at the exposure stage.

9. A photosensitive material processing method according to claim 5, wherein when the photosensitive materials are conveyed, the rear ends of the photosensitive materials are made uniform.

10. A photosensitive material processing method according to claim 3, wherein when the photosensitive materials are conveyed, the rear ends of the photosensitive materials are made uniform.

11. A photosensitive material processing method, in which a sheet-formed photosensitive material, which has been cut to predetermined sizes, is conveyed to an exposure stage and processed, wherein:

the exposure stage has a function of exposing simultaneously a plurality of sheet-formed photosensitive materials, and at the upstream of the exposure stage, the photosensitive materials are sorted and conveyed so as to be able to be exposed simultaneously; and wherein when the photosensitive materials are conveyed, the rear ends of the photosensitive materials are made uniform.

12. A photosensitive material processing method, in which a sheet-formed photosensitive material, which has been cut to predetermined sizes, is conveyed to an exposure stage and processed, wherein:

the exposure stage has a function of exposing simultaneously a plurality of sheet-formed photosensitive materials, and at the upstream of the exposure stage, the photosensitive materials are sorted and conveyed so as to be able to be exposed simultaneously;

wherein the time in which the photosensitive materials are sorted to the conveying paths is one of shorter than and equal to the time in which the photosensitive materials are exposed at the exposure stage; and wherein when the photosensitive materials are conveyed, the rear ends of the photosensitive materials are made uniform.

13. A photosensitive material processing apparatus in which a plurality of sheet-formed photosensitive materials, which has been withdrawn from a magazine accommodating an elongated photosensitive material and has been cut to predetermined sizes, is disposed in a row, conveyed to an exposure stage, and processed, comprising:

a magazine in which the photosensitive materials are taken up and accommodated in a layer form;

photosensitive material preparing means in which the photosensitive materials are withdrawn from the magazines and are cut to predetermined sizes so as to prepare sheet-formed photosensitive materials and in which the sheet-formed photosensitive materials are conveyed to initial positions of conveying paths;

sorting means in which the photosensitive materials disposed at the initial positions of the conveying paths are sorted in the direction normal to the conveying directions of the photosensitive materials;

conveying means in which the plurality of photosensitive materials are simultaneously conveyed to the exposure stage; and timing control means in which the conveyance timing of the photosensitive materials is controlled such that, during the exposure processing time at the exposure stage, sorting of the photosensitive materials by said sorting means is completed, and synchronized with the conveyance of the photosensitive materials to the exposure stage by said conveying means, said photosensitive material preparing means is operated so that the next photosensitive material is conveyed to the initial position.

14. A photosensitive material processing apparatus in which a plurality of sheet-formed photosensitive materials, which has been cut to predetermined sizes, is disposed in a row, conveyed to an exposure stage, and processed, comprising:

a magazine in which elongated photosensitive materials are accommodated;

photosensitive material preparing means in which the photosensitive materials are withdrawn from said magazine and are cut to predetermined sizes so as to prepare sheet-formed photosensitive materials and in which the sheet-formed photosensitive materials are conveyed to initial positions of conveying paths;

sorting means in which the rear ends of the photosensitive materials disposed at the initial positions of the conveying paths are made uniform and the photosensitive materials are sorted in the direction normal to the conveying directions of the photosensitive materials;

conveying means in which, when the sorted photosensitive materials are disposed at corresponding start positions of the conveying paths, the plurality of photosensitive materials on the conveying paths are simultaneously conveyed to the exposure stage; and timing control means in which the conveyance timing of the photosensitive material is controlled such that, during the exposure processing time at the exposure stage, sorting of the photosensitive materials by said sorting means is completed, and synchronized with the conveyance of the photosensitive materials to the exposure stage by said conveying means, said photosensitive material preparing means is operated so that the next photosensitive material is conveyed to the initial position.

15. A photosensitive material processing apparatus according to claim 14, wherein said sorting means comprises:

holding means in which the photosensitive materials withdrawn from said magazine are nipped and held at the positions which do not interfere with the conveying paths;

moving means in which said holding means is moved in the direction normal to the conveying paths so as to correspond to each of the plurality of arranged conveying paths;

a rear end detection sensor which is provided in the vicinity of the further upstream side of said holding means and in which the rear ends of the cut photosensitive materials are detected;

a temporary accommodating portion which is provided at each of the conveying paths and is disposed so as to correspond to a stop position of said moving means;

inversely conveying means in which, when the rear ends of the photosensitive materials are detected by said rear end detection sensor and said moving means is disposed at the position corresponding to a predetermined conveying path, the photosensitive materials are conveyed certain lengths in the directions of said temporary accommodating portions with the rear ends of the photosensitive materials being the first; and conveying means in which, when the predetermined photosensitive materials are accommodated within said temporary accommodating portions at the conveying paths by said inversely conveying means, the photosensitive materials are conveyed to the exposure stage.

* * * * *